United States Patent
Maamari et al.

(10) Patent No.: US 12,068,929 B1
(45) Date of Patent: Aug. 20, 2024

(54) LOGICAL CHANNEL PRIORITIZATION FOR SYNCHRONIZATION

(71) Applicant: QUALCOMM Incorporated, San Diego, CA (US)

(72) Inventors: Diana Maamari, San Diego, CA (US); Linhai He, San Diego, CA (US); Mickael Mondet, Louannec (FR); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/469,138

(22) Filed: Sep. 18, 2023

(51) Int. Cl.
*H04L 41/5022* (2022.01)
*H04L 41/34* (2022.01)

(52) U.S. Cl.
CPC .......... *H04L 41/5022* (2013.01); *H04L 41/34* (2022.05)

(58) Field of Classification Search
CPC ............................. H04L 41/34; H04L 41/5022
USPC ......................................................... 709/224
See application file for complete search history.

(56) References Cited

U.S. PATENT DOCUMENTS

| 11,690,030 B2 * | 6/2023 | Zhu ........................ | H04W 24/08 370/350 |
| 2019/0053250 A1 * | 2/2019 | He ........................... | H04W 28/00 |
| 2022/0322477 A1 * | 10/2022 | Sengupta ............. | H04B 7/1851 |
| 2023/0118526 A1 * | 4/2023 | Vangala ............... | H04W 72/535 370/329 |

FOREIGN PATENT DOCUMENTS

| CN | 105557061 A | * | 5/2016 | ............. H04W 24/02 |
| CN | 113906692 A | * | 1/2022 | ............. H04W 24/08 |
| WO | WO-2023011165 A1 | * | 2/2023 | |
| WO | WO-2023146337 A1 | * | 8/2023 | |
| WO | WO-2023207331 A1 | * | 11/2023 | |
| WO | WO-2024009261 A1 | * | 1/2024 | ......... H04W 72/1268 |

\* cited by examiner

*Primary Examiner* — Wing F Chan
*Assistant Examiner* — Leon Y Tseng
(74) *Attorney, Agent, or Firm* — Kevin M. Donnelly; Harrity & Harrity, LLP

(57) ABSTRACT

Various aspects of the present disclosure generally relate to wireless communication. Some aspects relate generally to logical channel prioritization for synchronization. Some aspects more specifically relate to a user equipment (UE) performing logical channel prioritization based on synchronization information. In some aspects, the synchronization information may include a synchronization threshold between two or more logical channels. For example, the two or more logical channels may be associated with traffic for a multi-modal service or application. A network node may configure the two or more logical channels with respective synchronization thresholds based on the multi-modal service or application.

30 Claims, 10 Drawing Sheets

LOGICAL CHANNEL PRIORITIZATION FOR SYNCHRONIZATION

FIELD OF THE DISCLOSURE

Aspects of the present disclosure generally relate to wireless communication and specifically relate to techniques, apparatuses, and methods for logical channel prioritization for synchronization.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

In some examples, a user equipment (UE) may schedule or allocate data to available uplink resources via logical channel (LCH) prioritization. As used herein, "logical channel" or "LCH" may refer to a channel between a radio link control (RLC) layer and a medium access control (MAC) layer that facilitates downlink communications from a network node to the UE and uplink communications from the UE to the network node. An LCH may reside in the control plane and carry control information or may reside in the user plane and carry data. For example, the network node may transmit configuration information that includes an LCH configuration for one or more LCHs. The LCH configuration may indicate a priority (for example, an LCH priority) for the LCH associated with the LCH configuration. The priority may be an integer value (for example, where a lower integer value indicates a higher priority).

The UE may select one or more LCHs to transmit traffic to the network node. For example, the UE may select traffic associated with the one or more LCHs to fill available resources for an uplink transmission (for example, to fill a MAC protocol data unit (PDU)). The UE may select the one or more LCHs based on, responsive to, or otherwise associated with priorities of respective LCHs that are associated with available uplink traffic to be transmitted. For example, packets for a higher priority LCH may be scheduled prior to packets from a lower priority LCH. In some examples, scheduling packets based only on LCH priority may result in missed transmission deadlines and/or a lack of synchronization between different packets. For example, some applications may generate multiple types of uplink flows of data. Different flows may have different timing deadlines and/or may be associated with synchronization. For example, different data flows for the same application may have different packet delay budgets and/or different data flows may be associated with packets that are to be synchronized. Scheduling the different data flows based only on LCH priority may result in missed transmission deadlines and/or a lack of synchronization between different packets for the different data flows.

SUMMARY

Some aspects described herein relate to a user equipment (UE) for wireless communication. The UE may include a processing system that includes one or more processors and one or more memories coupled with the one or more processors. The processing system may be configured to cause the UE to receive configuration information for a set of logical channels that indicates a set of synchronization thresholds respectively associated with the set of logical channels. The processing system may be configured to cause the UE to transmit first data via a first logical channel, from the set of logical channels, in association with a delay between the first data and second data of a second logical channel satisfying a synchronization threshold, of the set of synchronization thresholds, that.

Some aspects described herein relate to a network node for wireless communication. The network node may include a processing system that includes one or more processors and one or more memories coupled with the one or more processors. The processing system may be configured to cause the network node to transmit configuration information for a set of logical channels that indicates a set of synchronization thresholds respectively associated with the set of logical channels. The processing system may be configured to cause the network node to receive first data via a first logical channel, from the set of logical channels, in association with a delay between the first data and second data of a second logical channel satisfying a synchronization threshold, of the set of synchronization thresholds, that.

Some aspects described herein relate to a method for wireless communication by a UE. The method may include receiving configuration information for a set of logical channels that indicates a set of synchronization thresholds respectively associated with the set of logical channels. The method may include transmitting first data via a first logical channel, from the set of logical channels, in association with a delay between the first data and second data of a second logical channel satisfying a synchronization threshold, of the set of synchronization thresholds, that.

Some aspects described herein relate to a method for wireless communication by a network node. The method may include transmitting configuration information for a set of logical channels that indicates a set of synchronization thresholds respectively associated with the set of logical channels. The method may include receiving first data via a first logical channel, from the set of logical channels, in association with a delay between the first data and second data of a second logical channel satisfying a synchronization threshold, of the set of synchronization thresholds, that.

Some aspects described herein relate to a non-transitory computer-readable medium that stores a set of instructions for wireless communication by a UE. The set of instructions, when executed by one or more processors of the UE, may cause the UE to receive configuration information for a set of logical channels that indicates a set of synchronization thresholds respectively associated with the set of logical channels. The set of instructions, when executed by one or more processors of the UE, may cause the UE to transmit first data via a first logical channel, from the set of logical channels, in association with a delay between the first data and second data of a second logical channel satisfying a synchronization threshold, of the set of synchronization thresholds, that.

Some aspects described herein relate to a non-transitory computer-readable medium that stores a set of instructions for wireless communication by a network node. The set of instructions, when executed by one or more processors of the network node, may cause the network node to transmit configuration information for a set of logical channels that indicates a set of synchronization thresholds respectively associated with the set of logical channels. The set of instructions, when executed by one or more processors of the network node, may cause the network node to receive first data via a first logical channel, from the set of logical channels, in association with a delay between the first data and second data of a second logical channel satisfying a synchronization threshold, of the set of synchronization thresholds, that.

Some aspects described herein relate to an apparatus for wireless communication. The apparatus may include means for receiving configuration information for a set of logical channels that indicates a set of synchronization thresholds respectively associated with the set of logical channels. The apparatus may include means for transmitting first data via a first logical channel, from the set of logical channels, in association with a delay between the first data and second data of a second logical channel satisfying a synchronization threshold, of the set of synchronization thresholds, that.

Some aspects described herein relate to an apparatus for wireless communication. The apparatus may include means for transmitting configuration information for a set of logical channels that indicates a set of synchronization thresholds respectively associated with the set of logical channels. The apparatus may include means for receiving first data via a first logical channel, from the set of logical channels, in association with a delay between the first data and second data of a second logical channel satisfying a synchronization threshold, of the set of synchronization thresholds, that.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
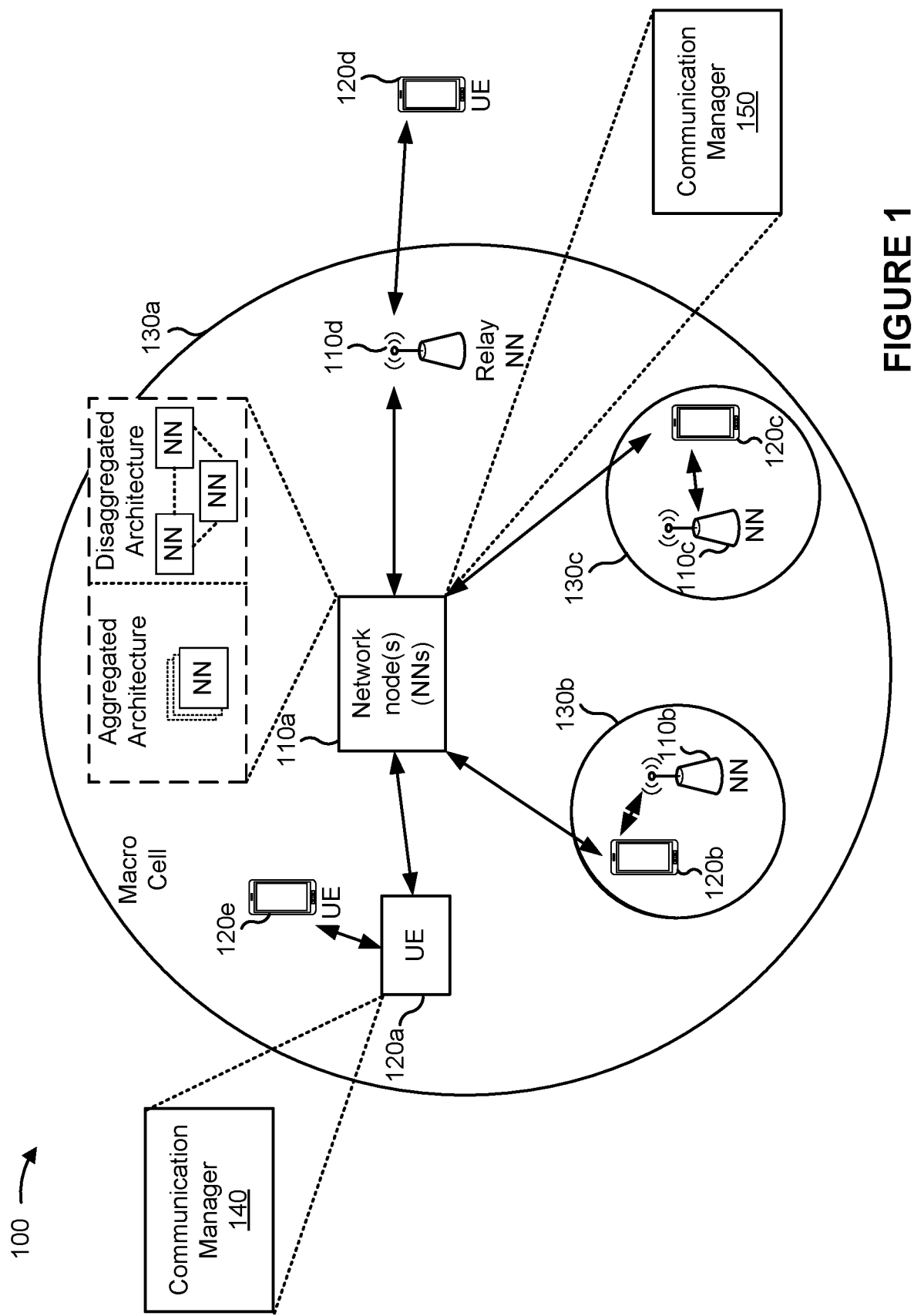
FIG. 1 is a diagram illustrating an example of a wireless communication network in accordance with the present disclosure.

Various aspects of the present disclosure are described hereinafter with reference to the accompanying drawings.

However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

In some examples, an application service may be a multi-modal service. The multi-modal service may be associated with multi-modal traffic. As used herein, "multi-modal traffic" may refer to traffic that is associated with multiple modes of an application. For example, some applications may generate multiple types of uplink flows of data (for example, multiple modes). For example, an application (for example, an extended reality (XR) application or a virtual reality (VR) application) may generate audio data, video data, positioning data, haptic data, and/or other types of data that are each associated with the application. For example, the application may enable input from more than one source, such as traffic flows for audio, video, positioning, and/or haptic, among other examples.

For example, the application service may be associated with a user equipment (UE) associated with a first mode (or a first service data flow) and a UE associated with a second mode (or a second service data flow). The UEs may be the same UE or may be different UEs. As an example, the UE associated with the first mode may include a headset, such as a VR headset or VR goggles (for example, associated with audio and/or video data). The UE associated with the second mode may include a wearable component, such as gloves, that is associated with obtaining haptic data as an input.

The multi-modal service may consist of multiple data flows (for example, referred to collectively as multi-modal flows) that are related to each other and may come from different sources. Each data flow (referred to individually as a single-modal data) may be viewed as one type of data (for example, audio, video, positioning, haptic, and/or another type of data) associated with the same communication service. Multi-modal flows may carry data that is closely related and may require strong coordination for correct delivery of the multi-modal application data. For example, synchronization between different data flows for the same multi-modal application (for example, between different media components of an XR application) may be important to ensure a positive user experience. For example, if data flows for different media components of the same multi-modal application are not synchronized, a user may be able to detect the lack of synchronization, resulting in a poor user experience. Therefore, in some cases, two or more data flows (for example, associated with different modalities or media components) may be associated with a synchronization threshold. As used herein, a "synchronization threshold" may refer to an allowable amount of time between transmission of traffic associated with two or more data flows (for example, associated with different modalities or media components) to ensure a lack of synchronization is not detected.

For example, because of the separate handling of the multiple media components associated with a multi-modal service or application, synchronization between different media components may reduce a likelihood of a negative impact on the user experience (for example, users detecting lack of synchronization). However, different data flows may have different timing deadlines. For example, different data flows for the same application may have different packet delay budgets. As a result, the different data flows for the same application may be associated with different logical channels (LCHs) (for example, that are associated with different priorities). For example, because of the different timing deadlines for data flows associated with different media components or modalities of the same application, the different data flows may be associated with different LCHs. Because a UE may transmit data based on, responsive to, or otherwise associated with LCH prioritization that considers only timing deadlines for the data flows (for example, considers only a packet delay budget or a remaining delay budget), this may result in a delay between data transmissions for different modalities not satisfying the synchronization threshold for the different modalities. For example, the UE may only consider the LCH priorities, the packet delay budget, and/or the remaining delay budget when scheduling or selecting traffic to be included in available uplink resources. As a result, there may be a delay between data transmissions for different modalities that does not satisfy the synchronization threshold for the different modalities. The delay may result in a noticeable lack of synchronization for the user, thereby degrading the user experience for the multi-modal service or application.

Various aspects relate generally to logical channel prioritization for synchronization. Some aspects more specifically relate to a UE performing logical channel prioritization based on, responsive to, or otherwise associated with synchronization information. In some aspects, the synchronization information may include a synchronization threshold between two or more LCHs. For example, the two or more LCHs may be associated with traffic for a multi-modal service or application. A network node may configure the two or more LCHs with respective synchronization thresholds based on, responsive to, or otherwise associated with the multi-modal service or application.

In some aspects, the UE may perform the logical channel prioritization as a function of the synchronization threshold(s), a delay threshold for a residual delay budget (RDB), and an LCH priority. For example, the UE may schedule a packet to be included in available uplink resources. The UE may determine if the packet is associated with a correlated packet or a correlated LCH. The UE may schedule a correlated packet to the scheduled packet (for example, from a correlated LCH) based on, responsive to, or otherwise associated with synchronization information for the packet and the correlated packet (for example, based on, responsive to, or otherwise associated with a synchronization threshold). For example, the UE may schedule the correlated packet (e.g., before scheduling one or more packets from a higher priority LCH) based on, responsive to, or otherwise associated with a delay between the correlated packet and the packet satisfying a synchronization threshold (e.g., a synchronization threshold associated with the LCH of the packet and/or the correlated LCH).

In some aspects, correlated LCHs may be LCHs that are associated the same multi-modal service or application. For example, the UE may first schedule a packet for an LCH configured with a delay threshold if the packet has an RDB that satisfies the delay threshold. The UE may schedule any correlated packets to the packet if a delay between the packet and the correlated packet satisfies a synchronization threshold. In some aspects, the UE may identify correlated LCHs based on, responsive to, or otherwise associated with a multi-modal service identifier. The multi-model service identifier may be indicated via a quality of service (QoS) flow or via a PDU header. Additionally or alternatively, the UE may receive configuration information indicating one or more correlated LCHs.

Particular aspects of the subject matter described in this disclosure can be implemented to realize one or more of the following potential advantages. In some examples, the described techniques can be used to improve a likelihood that related packets associated with a multi-modal service or application are synchronized (for example, in the time domain) when logical channel prioritization is performed. By synchronizing the packets associated with the multi-modal service or application, a likelihood of a delay between the packets being detectable by a user may be reduced. This may improve a user experience associated with the multi-modal service or application.

Additionally, by performing logical channel prioritization using delay information (for example, one or more delay thresholds) and synchronization information (for example, one or more synchronization thresholds), the UE may ensure that transmission deadlines for packets are not missed and that scheduled packets that are to synchronized are transmitted close together. For example, the UE may be enabled to schedule one or more packets (for example, from a lower priority LCH) near a transmission of a related packet from the same multi-modal service or application prior to another packet from a higher priority LCH. Further, by indicating correlated LCHs via a multi-modal service identifier that is indicated by a QoS flow or a PDU header, the UE may identify the correlated or related packets without explicit indications from a network node, thereby reducing the complexity associated with identifying the correlated LCHs and conserving network resources that would have otherwise been used to transmit a communication indicating the correlated LCHs.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, XR and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110a, a network node 110b, a network node 110c, and a network node 110d. The network nodes 110 may support communications with multiple UEs 120, shown as a UE 120a, a UE 120b, a UE 120c, a UE 120d, and a UE 120e.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHz, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110a may be a macro network node for a macro cell 130a, the network node 110b may be a pico network node for a pico cell 130b, and the network node 110c may be a femto network node for a femto cell 130c.Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In such examples, the wireless communication network 100 may include or be referred to as a "multi-hop network." In the example shown in FIG. 1, the network node 110d (for example, a relay network node) may communicate with the network node 110a (for example, a macro network node) and the UE 120d in order to facilitate communication between the network node 110a and the UE 120d. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G long term evolution (LTE), 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC) UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an unmanned aerial vehicle or drone, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120a and UE 120e) may communicate directly with one another using sidelink communications (for example, without communicating by way of a network node 110 as an intermediary). As an example, the UE 120a may directly transmit data, control information, or other signaling as a sidelink communication to the UE 120e. This is in contrast to, for example, the UE 120a first transmitting data in an UL communication to a network node 110, which then transmits the data to the UE 120e in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, the UE 120 may include a communication manager 140. As described in more detail elsewhere herein, the communication manager 140 may receive configuration information for a set of logical channels that indicates a set of synchronization thresholds respectively associated with the set of logical channels; and transmit first data via a first logical channel, from the set of logical channels, in association with a delay between the first data and second data of a second logical channel satisfying a synchronization threshold, of the set of synchronization thresholds, that. Additionally or alternatively, the communication manager 140 may perform one or more other operations described herein.

In some aspects, the network node 110 may include a communication manager 150. As described in more detail elsewhere herein, the communication manager 150 may transmit configuration information for a set of logical channels that indicates a set of synchronization thresholds respectively associated with the set of logical channels; and receive first data via a first logical channel, from the set of logical channels, in association with a delay between the first data and second data of a second logical channel satisfying a synchronization threshold, of the set of synchronization thresholds, that. Additionally or alternatively, the communication manager 150 may perform one or more other operations described herein.

Figure 2:
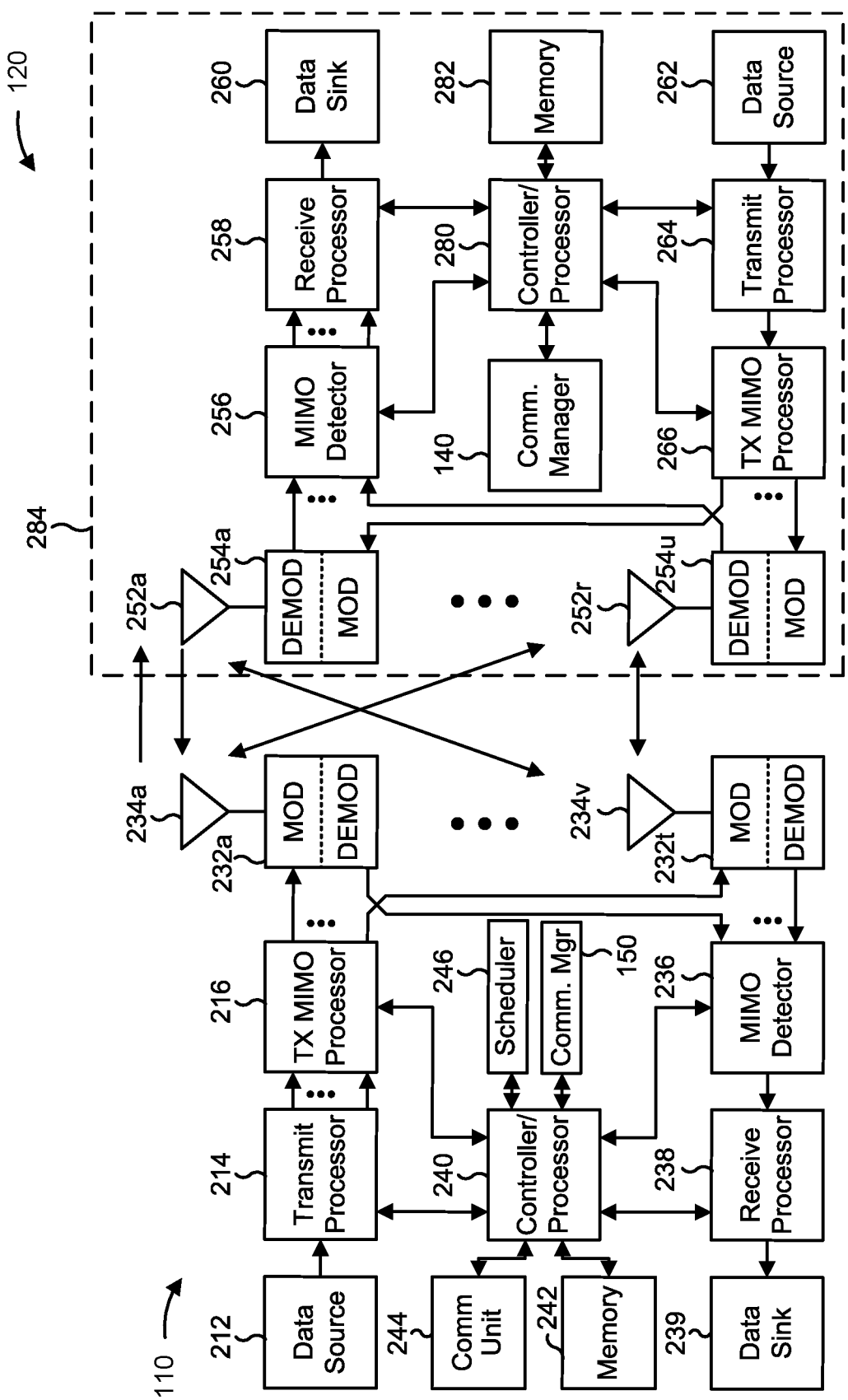
FIG. 2 is a diagram illustrating an example network node in communication with an example user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232a through 232t, where t≥1), a set of antennas 234 (shown as 234a through 234v, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232a through 232t may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252a through 252r, where r≥1), a set of modems 254 (shown as modems 254a through 254u, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254a through 254u may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different quantity of antenna elements. For example, a UE 120 may include a single antenna element, two antenna elements, four antenna elements, eight antenna elements, or a different quantity of antenna elements. As another example, a network node 110 may include eight antenna elements, 24 antenna elements, 64 antenna elements, 128 antenna elements, or a different quantity of antenna elements. Generally, a larger quantity of antenna elements may provide increased control over parameters for beam generation relative to a smaller quantity of antenna elements, whereas a smaller quantity of antenna elements may be less complex to implement and may use less power than a larger quantity of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

Figure 3:
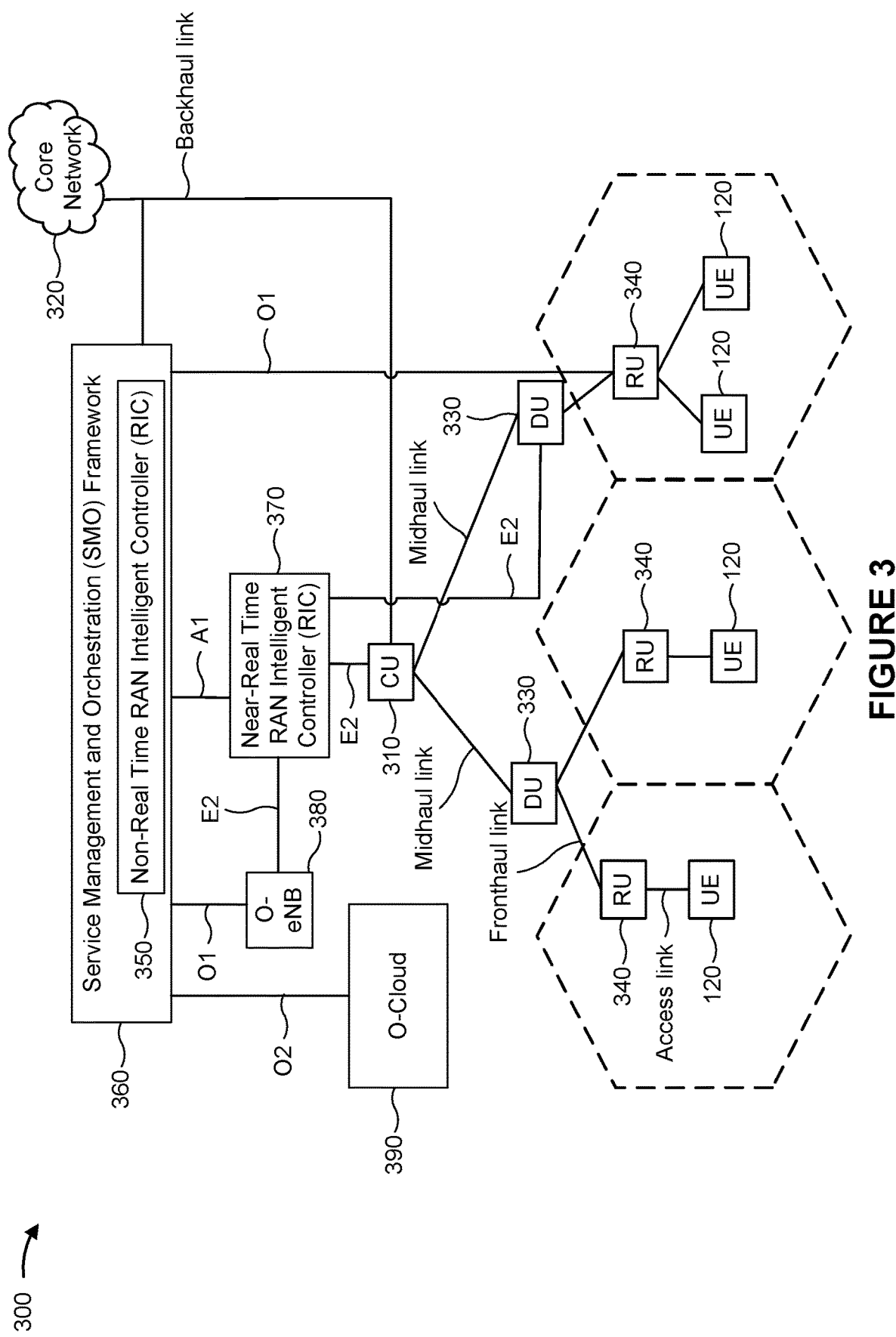
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU-UP units and one or more CU-CP units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with logical channel prioritization for synchronization, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 700 of FIG. 7, process 800 of FIG. 8, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 700 of FIG. 7, process 800 of FIG. 8, or other processes as described herein (alone or in conjunction with one or more other processors). In some examples, executing instructions may include running the instructions, converting the instructions, compiling the instructions, and/or interpreting the instructions, among other examples.

In some aspects, the UE 120 includes means for receiving configuration information for a set of logical channels that indicates a set of synchronization thresholds respectively associated with the set of logical channels; and/or means for transmitting first data via a first logical channel, from the set of logical channels, in association with a delay between the first data and second data of a second logical channel satisfying a synchronization threshold, of the set of synchronization thresholds, that. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting configuration information for a set of logical channels that indicates a set of synchronization thresholds respectively associated with the set of logical channels; and/or means for receiving first data via a first logical channel, from the set of logical channels, in association with a delay between the first data and second data of a second logical channel satisfying a synchronization threshold, of the set of synchronization thresholds, that. The means for the network node 110 to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

Figure 4:
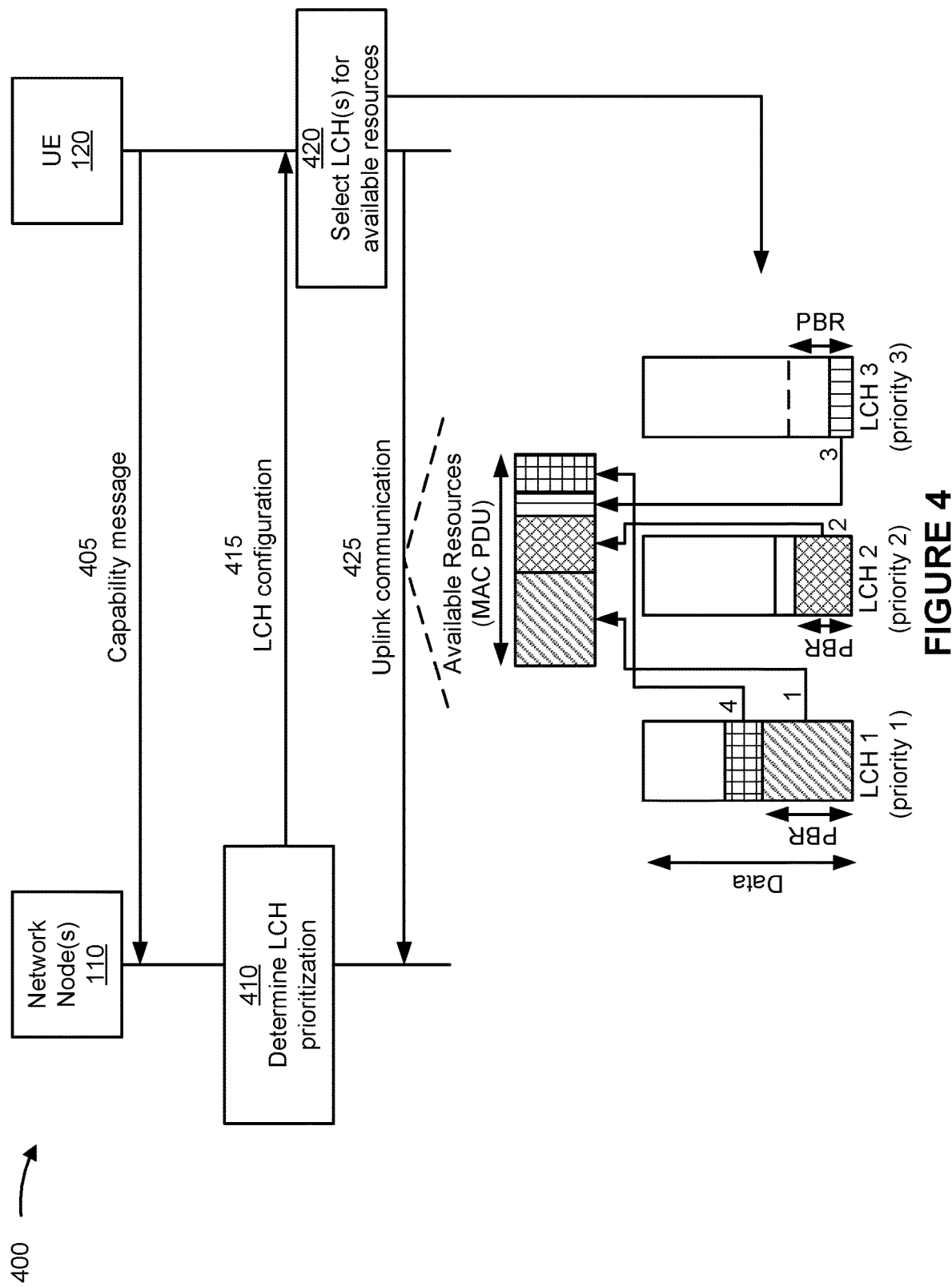
FIG. 4 is a diagram illustrating an example associated with logical channel prioritization in accordance with the present disclosure.

FIG. 4 is a diagram illustrating an example associated with logical channel prioritization 400 in accordance with the present disclosure. As shown in FIG. 4, one or more network nodes 110 and a UE 120 may communicate with one another (for example, on a wireless network, such as wireless network 100 of FIG. 1). The network node(s) 110 may each include an RU and/or a device controlling the RU, such as a DU and/or a CU. The network node(s) 110 may each be associated with at least one TRP (for example, within a cell).

In a first operation 405, the UE 120 may transmit, and the network node(s) 110 may receive, a capability message indicating that the UE 120 is configured for LCH restrictions. For example, the capability message may include a UECapabilityInformation message, as defined in 3GPP specifications. Accordingly, the UE 120 may indicate that the UE 120 is configured for LCH restrictions using an lcp-Restriction information element (IE), as defined in 3GPP specifications. In some aspects, the network node(s) 110 may transmit, and the UE 120 may receive, a request for the capability message (for example, a UECapabilityEnquiry message, as defined in 3GPP specifications). The UE 120 may transmit, and the network node(s) 110 may receive, the capability message in response to the request.

In a second operation 410, the network node(s) 110 may determine a logical channel prioritization (LCP) for the UE 120. The network node(s) 110 may determine priorities for respective LCHs. For example, each LCH may be associated with a priority. In some examples, the priority may be an integer value (for example, from 1 to 16, where 1 is the highest priority and 16 is the lowest priority). In some examples, the network node(s) 110 may determine at least one restriction (for example, an LCP restriction) based at least in part on a QoS requirement associated with an LCH for the UE 120. As used herein, "logical channel" or "LCH" may refer to a channel between an RLC layer and a MAC layer that facilitates downlink communications from the network node(s) 110 to the UE 120 and uplink communications from the UE 120 to the network node(s) 110. An LCH may reside in the control plane and carry control information or may reside in the user plane and carry data.

In one example, the network node(s) 110 may identify traffic that is delay-sensitive (for example, traffic for an XR application). Accordingly, the network node(s) 110 may determine a restriction for an LCH, to which the delay-sensitive traffic is assigned, that will route the delay-sensitive traffic to a physical channel (for example, to a TRP of the network node(s) 110) with higher data rate (for example, lower data load). In another example, the network node(s) 110 may identify traffic that is error-sensitive (for example, pose updates for an XR application). Accordingly, the network node(s) 110 may determine a restriction for an LCH, to which the error-sensitive traffic is assigned, that will route the error-sensitive traffic to a TRP of the network node(s) 110 with greater robustness (for example, higher quality and/or reliability). In another example, the network node(s) 110 may identify an LCH associated with control information for the UE 120. Accordingly, the network node(s) 110 may determine a restriction for the LCH, to which the control information is assigned, that will route the control information to a TRP of the network node(s) 110 with greater robustness (for example, higher quality and/or reliability).

In some examples, the network node(s) 110 may determine a prioritized bit rate (PBR) for each LCH. The PBR may be a data rate provided to one LCH before allocating any resources to a lower priority LCH. For example, to avoid starvation of some LCHs (for example, to avoid scenarios in which a traffic for a given LCH is unable to be transmitted because higher priority LCHs have traffic that is filling the available resources), the PBR may set a limit for each LCH. For example, when filling the available resources, the PBR may indicate an amount of data that is to be added from each LCH. If there is any remaining resources, then the available resources may be filled according to the priority of the LCHs.

In a third operation 415, the network node(s) 110 may transmit, and the UE 120 may receive, a configuration, for a set of LCHs, that indicates the at least one restriction (for an LCH in the set of LCHs). For example, in the third operation 415, the network node(s) 110 may transmit configuration information that includes an LCH configuration for one or more LCHs. An LCH configuration may include a LogicalChannelConfig RRC parameter (for example, as defined, or otherwise fixed, by the 3GPP). The LCH configuration may indicate a priority (for example, an LCH priority) and/or a PBR (for example, via a prioritisedBitRate IE) for the LCH associated with the LCH configuration.

In a fourth operation 420, the UE 120 may select one or more LCHs for traffic to transmit to the network node(s) 110. For example, different LCHs may be associated with different QoS requirements, as described above. In some examples, the UE 120 may select traffic associated with the one or more LCHs to fill available resources for an uplink transmission (for example, to fill a MAC protocol data unit (PDU)). The UE 120 may select the one or more LCHs based on, responsive to, or otherwise associated with priorities of respective LCHs that are associated with available uplink traffic to be transmitted.

For example, as shown in FIG. 4, an uplink buffer of the UE 120 may indicate that an LCH 1, an LCH 2, and an LCH 3 are associated with uplink traffic that is available to be transmitted. The LCH 1 may be associated with a priority 1 and a first PBR. The LCH 2 may be associated with a priority 2 (for example, indicating a lower priority than the priority 1) and a second PBR. The LCH 3 may be associated with a priority 3 (for example, indicating a lower priority than the priority 1 and the priority 2) and a third PBR.

In the fourth operation 420, the UE 120 may first select traffic from the LCH 1 to be included in the MAC PDU up to an amount of traffic indicated by the first PBR. The UE 120 may second select traffic from the LCH 2 to be included in the MAC PDU up to an amount of traffic indicated by the second PBR. The UE 120 may third select traffic from the LCH 3 to be included in the MAC PDU up to an amount of traffic indicated by the third PBR. As shown in FIG. 4, the LCH 3 may be associated with less traffic than the amount of traffic indicated by the third PBR, enabling the UE 120 to select all the traffic associated with the LCH 3. The UE 120 may fill any remaining space in the available resources (for example, in the MAC PDU) in accordance with the priorities of the LCHs. For example, the UE 120 may fourth fill the remaining space in the available resources (for example, in the MAC PDU) with traffic associated with the LCH 1 (for example, because the LCH 1 has the highest priority). If there are any remaining resources after adding the traffic associated with the LCH 1 to the MAC PDU, then the UE 120 may fill the remaining space in the available resources (for example, in the MAC PDU) with traffic associated with the LCH 2.

In a fifth operation 425, the UE 120 may transmit an uplink communication using the LCH(s). For example, the UE 120 may transmit the uplink communication via the available resources (for example, via the MAC PDU). The traffic (for example, data or control information) included in the uplink communication may be based on, responsive to, or otherwise associated with selection of the traffic in accordance with the LCH priorities (for example, as performed in the fourth operation 420).

Figure 5:
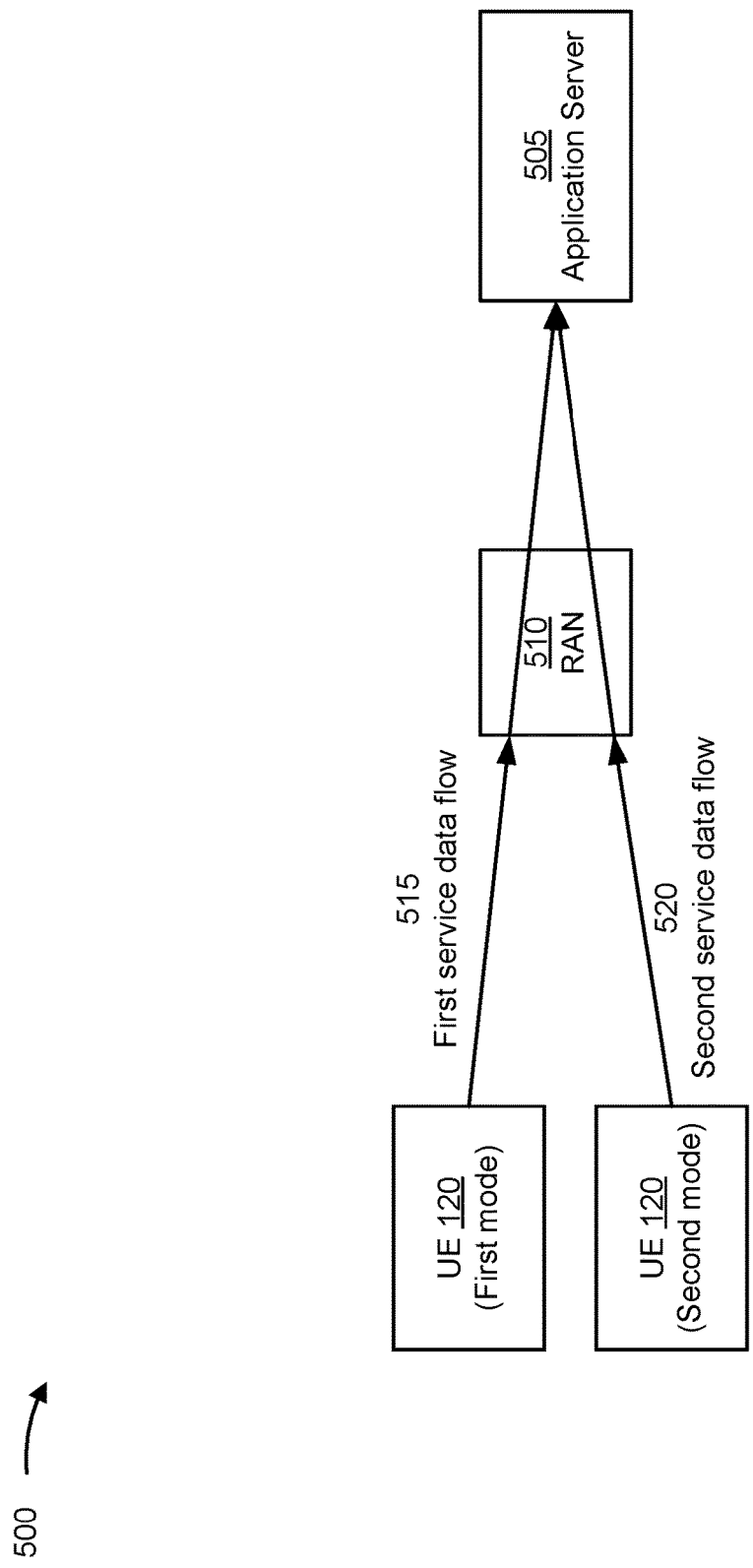
FIG. 5 is a diagram illustrating an example associated with multi-modal traffic in accordance with the present disclosure.

FIG. 5 is a diagram illustrating an example associated with multi-modal traffic 500 in accordance with the present disclosure. As shown in FIG. 5, one or more UEs 120 may communicate with an application server 505 via an RAN 510. The RAN 510 may be a wireless network, such as wireless network 100 of FIG. 1. The RAN 510 may include one or more network nodes 110, such as one or more RUs, one or more DUs, and/or one or more CUs, among other examples. The application server 505 may be associated with an application service (for example, may serve or otherwise support the application service). As an example, the application service may be associated with an XR service, a VR service, and/or another type of service.

In some examples, the application service may be a multi-modal service. The multi-modal service may be associated with multi-modal traffic. As used herein, "multi-modal traffic" may refer to traffic that is associated with multiple modes of an application. For example, some applications may generate multiple types of uplink flows of data (for example, multiple modes). For example, an application (for example, an XR application or a VR application) may generate audio data, video data, positioning data, haptic data, and/or other types of data that are each associated with the application. For example, the application server 505 may support an application that enables inputs from more than one source, such as traffic flows for audio, video, positioning, haptic, among other examples.

For example, as shown in FIG. 5, the application service may be associated with a UE 120 associated with a first mode (or a first service data flow 515) and a UE 120 associated with a second mode (or a second service data flow 520). The UEs 120 shown in FIG. 5 may be the same UE or may be different UEs. As an example, the UE 120 associated with the first mode may include a headset, such as a VR headset or VR goggles (for example, associated with audio and/or video data). The UE 120 associated with the first mode may include a wearable component, such as gloves, that is associated with obtaining haptic data as an input.

The multi-modal service may include multiple data flows (for example, referred to collectively as multi-modal flows) that are related to each other and may come from different sources. Each data flow (referred to individually as a single-modal data) may be viewed as one type of data (for example, audio, video, positioning, haptic, and/or another type of data) associated with the same communication service. Data flows that comprise a multi-modal service may originate from a single UE (either via a single device or via multiple devices connected to the single UE) or from multiple UEs. A multi-modal flow may be associated with a multi-modal service identifier (ID). The multi-modal service ID may be an indicator that the application traffics are related to a multi-modal service. A policy control function (PCF) of the RAN 510 may use information indicated by the multi-modal service ID to derive the correct policy and charging control (PCC) rules and apply QoS policies for data flows that are part of a given multi-modal application.

Multi-modal flows may carry data that is closely related and may require strong coordination for correct delivery of the multi-modal application data. For example, synchronization between different data flows for the same multi-modal application (for example, between different media components of an XR application) may be important to ensure a positive user experience. For example, if data flows for different media components of the same multi-modal application are not synchronized, a user may be able to detect the lack of synchronization, resulting in a poor user experience. Therefore, in some cases, two or more data flows (for example, associated with different modalities or media components) may be associated with a synchronization threshold. As used herein, a "synchronization threshold" may refer to an allowable amount of time between transmission of traffic associated with two or more data flows (for example, associated with different modalities or media components) to ensure a lack of synchronization is not detected. For example, a synchronization threshold may be defined as an allowable (for example, a maximum) tolerable temporal separation of the onset of two stimuli, one of which is presented to one sense and the other to another sense, such that the accompanying sensory objects are perceived as being synchronous. The synchronization threshold may also be referred to as a multi-modal synchronization threshold.

For example, because of the separate handling of the multiple media components associated with a multi-modal service or application, synchronization between different media components may reduce a likelihood of a negative impact on the user experience (for example, users detecting lack of synchronization). Applying synchronization thresholds in the RAN 510 may be helpful in support of immersive multi-modal applications when the synchronization threshold between two or more modalities is less than the latency key performance indicator (KPI) for the application. As an example, a synchronization threshold between an audio data flow and a tactile data flow may include an allowable audio delay of 50 ms (for example, indicating that audio data should be at most 50 ms delayed compared to corresponding tactile data) and an allowable tactile delay of 25 ms (for example, indicating that tactile data should be at most 25 ms delayed compared to corresponding audio data). As another example, a synchronization threshold between a visual data flow and a tactile data flow may include an allowable visual delay of 15 ms (for example, indicating that visual data should be at most 15 ms delayed compared to corresponding tactile data) and an allowable tactile delay of 50 ms (for example, indicating that tactile data should be at most 50 ms delayed compared to corresponding visual data). For each data flow or media component, "delay" may refer to the case where that media component is delayed compared to the other (for example, the visual delay may refer to a delay of the visual data flow as compared to the tactile data flow).

Different data flows may have different timing deadlines. For example, different data flows for the same application may have different packet delay budgets. As an example, an application may generate pose or control packets of information that may have a packet delay budget of 4 ms, and which may arrive for transmission (for example, be generated) with a period of 10 ms. Such pose data may be based on, responsive to, or otherwise associated with movement of a user's head, and/or a user's field of vision, among other examples. For example, the application may sample the head position every 10 ms and generate an update to send to the other end of the application (such as the application server 505). The application may also generate hand gesture tracking information to track movement of a user's hand, and which may have a longer packet delay budget of 10 ms and may arrive for transmission every 40 ms (for example, with a period of 40 ms). The application may generate voice or audio for transmission, which may have a longer delay budget of 15 ms and may arrive for transmission with a period of 20 ms. In this example, the application may generate different flows of traffic that may have different packet delay budgets and different generation periods.

As a result, the different data flows for the same application may be associated with different LCHs (for example, that are associated with different priorities). For example, because of the different timing deadlines for data flows associated with different media components or modalities of the same application, the different data flows may be associated with different LCHs. Because a UE may transmit data based on, responsive to, or otherwise associated with LCH prioritization that considers only timing deadlines for the data flows (for example, considers only a packet delay budget or a remaining delay budget), this may result in a delay between data transmissions for different modalities not satisfying the synchronization threshold for the different modalities. For example, the UE may only consider the LCH priorities, the packet delay budget, and/or the remaining delay budget when scheduling or selecting traffic to be included in available uplink resources. As a result, there may be a delay between data transmissions for different modalities that does not satisfy the synchronization threshold for the different modalities. The delay may result in a noticeable lack of synchronization for the user, thereby degrading the user experience for the application.

Figure 6:
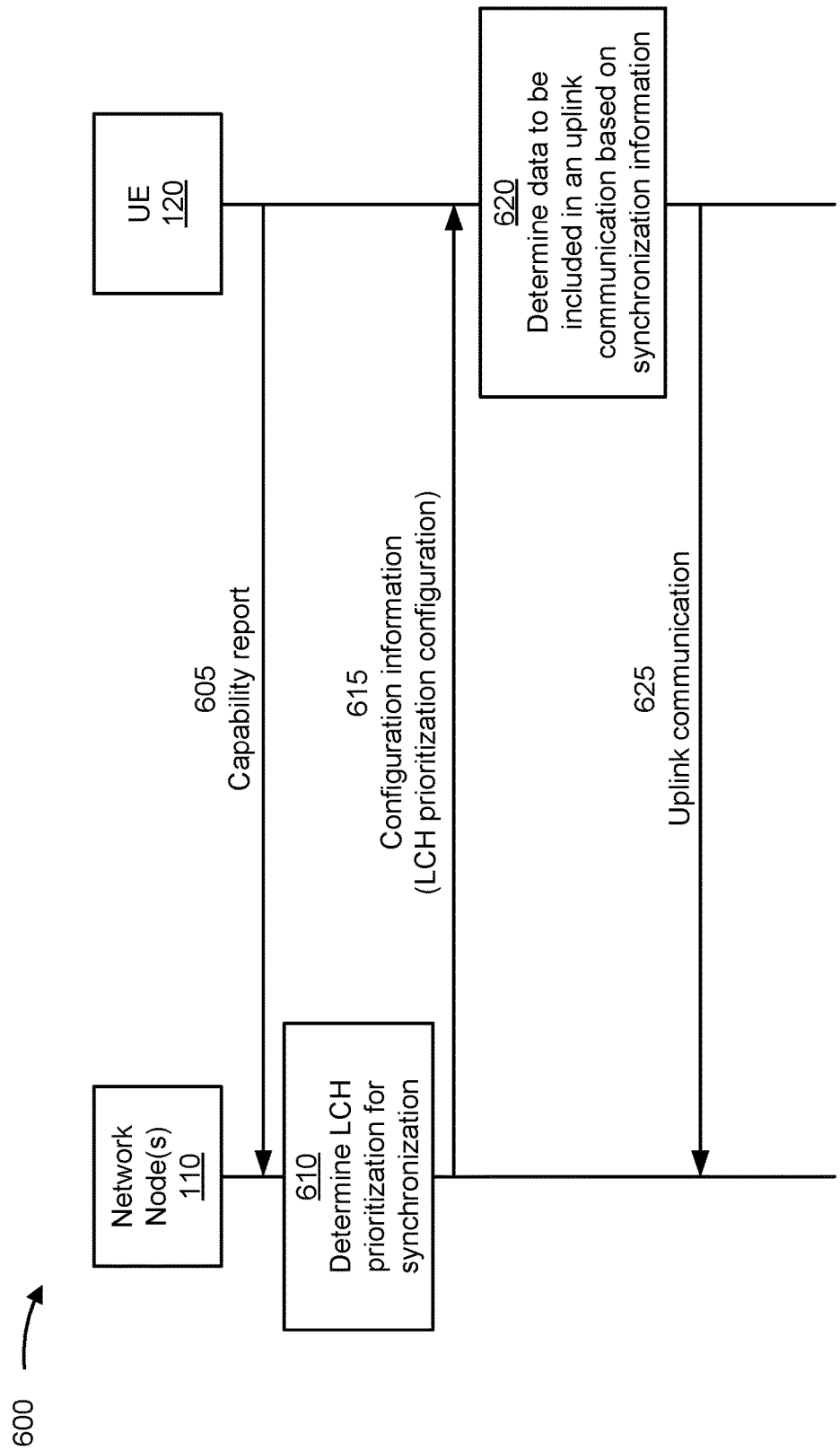
FIG. 6 is a diagram of an example operations associated with logical channel prioritization for synchronization in accordance with the present disclosure.

FIG. 6 is a diagram of an example operations 600 associated with logical channel prioritization for synchronization in accordance with the present disclosure. As shown in FIG. 6, one or more network nodes 110 (for example, a base station, a CU, a DU, and/or an RU) may communicate with a UE 120. In some aspects, the network node(s) 110 and the UE 120 may be part of a wireless network, such as the wireless network 100. The UE 120 and the network node(s) 110 may have established a wireless connection prior to operations shown in FIG. 6.

In a first operation 605, the UE 120 may transmit, and the network node 110 may receive, a capability report. The capability report may indicate whether the UE 120 supports a feature and/or one or more parameters related to the feature. The capability report may indicate capability information. For example, the capability information may indicate a capability and/or parameter for performing LCH prioritization using synchronization information. As another example, the capability report may indicate a capability and/or parameter for performing LCH prioritization using synchronization thresholds associated with a multi-modal service or application. One or more operations described herein may be based on, responsive to, or otherwise associated with capability information of the capability report. For example, the UE may perform a communication in accordance with the capability information, or may receive configuration information that is in accordance with the capability information. In some aspects, the capability report may indicate UE support for receiving configuration information for a set of LCHs indicating synchronization thresholds for respective LCHs of the set of loLCHs. Additionally or alternatively, the capability report may indicate UE support for transmitting an uplink communication that includes data that is selected and/or scheduled via one or more LCHs, from the set of LCHs, that are prioritized in association with the synchronization thresholds.

In a second operation 610, the network node 110 may determine LCH prioritization for synchronization associated with a multi-modal service or application. For example, the network node 110 may determine that one or more LCHs are to be associated with synchronization and/or deadline-based scheduling. For example, "deadline-based" scheduling may refer to scheduling LCHs based on, responsive to, or otherwise associated with a delay threshold and an RDB (or remaining delay budget) for traffic associated with a given LCH. For example, the network node 110 may determine priority levels for respective LCHs of the one or more LCHs. Additionally, the network node 110 may determine delay thresholds for the respective LCHs of the one or more LCHs. The network node 110 may configure each of the LCHs with a delay threshold to be applied to an RDB of a PDU. The UE 120 may compare the RDB for each PDU buffered for the LCH to the delay threshold. Each LCH may be configured with an LCH scheduling priority to be used for LCP. The UE 120 may schedule the transmission of data from the different LCHs based on, responsive to, or otherwise associated with priority and based on, responsive to, or otherwise associated with delay thresholds.

For example, if no packets in the subset of deadline-based LCHs have a residual delay budget that exceeds the corresponding delay threshold, each of the LCHs (for example, including deadline based LCHs and any priority based LCHs) may be scheduled using a strict priority scheme (for example, a priority based scheme that does not schedule based on, responsive to, or otherwise associated with delay or synchronization). For example, the UE 120 may fill uplink resources of a TB with packets from one or more LCHs based on, responsive to, or otherwise associated with a strict priority procedure. If at least one packet in the subset of deadline-based LCHs has a residual delay budget that exceeds the corresponding delay threshold, the uplink resources in an available TB may then be filled according to a procedure in which LCHs with packets that have exceeded their delay thresholds are scheduled first. For example, if at least one PDU has a residual delay budget below a threshold amount of time, then the UE 120 may switch to filling the uplink resources of the TB based on, responsive to, or otherwise associated with a shortest residual delay budget.

Additionally or alternatively, the network node 110 may determine synchronization thresholds for the respective LCHs of the one or more LCHs. For example, the network node 110 may determine one or more LCHs that are to be associated with synchronization-based scheduling. The network node 110 may determine synchronization thresholds for the respective LCHs. For example, the network node 110 may configure the one or more LCHs with respective synchronization thresholds. The network node 110 may determine the synchronization threshold(s) based on, responsive to, or otherwise associated with a modality or media component associated with traffic that is to be communication via the LCH(s).

In some aspects, the network node 110 may determine a relationship or a correlation between different LCHs (for example, based on, responsive to, or otherwise associated with a multi-modal service or application). For example, the network node 110 may determine that one or more LCHs are associated with a multi-modal service ID (for example, indicating that the one or more LCHs are related and/or correlated with each other). As an example, the network node 110 may determine that LCHs are associated with different types of traffic (for example, different modalities or different media components) for a multi-modal service or application. In some aspects, the network node 110 may determine that a given LCH is associated with a synchronization threshold for each associated LCH (for example, for each related or correlated LCH). For example, the network node 110 may determine that a first LCH is associated with a second LCH and a third LCH (for example, the first LCH, the second LCH, and the third LCH may be associated with different types of traffic for the same multi-modal service or application). The network node 110 may determine that the first LCH is associated with a first synchronization threshold for the second LCH. Additionally, the network node 110 may determine that the first LCH is associated with a second synchronization threshold for the third LCH. As another example, a synchronization threshold for a given LCH may indicates different values for respective associated LCHs.

In a third operation 615, the network node 110 may transmit, and the UE may receive, configuration information. In some aspects, the UE may receive the configuration information via one or more of system information (for example, a master information block (MIB) and/or a system information block (SIB), among other examples), RRC signaling, one or more MAC-CEs, and/or DCI, among other examples.

In some aspects, the configuration information may indicate one or more candidate configurations and/or communication parameters. In some aspects, the one or more candidate configurations and/or communication parameters may be selected, activated, and/or deactivated by a subsequent indication. For example, the subsequent indication may select a candidate configuration and/or communication parameter from the one or more candidate configurations and/or communication parameters. In some aspects, the subsequent indication may include a dynamic indication, such as one or more MAC-CEs and/or one or more DCI messages, among other examples.

In some aspects, the configuration information described in connection with the third operation 615 and/or the capability report may include information transmitted via multiple communications. Additionally or alternatively, the network node 110 may transmit the configuration information, or a communication including at least a portion of the configuration information, before and/or after the UE 120 transmits the capability report. For example, the network node 110 may transmit a first portion of the configuration information before the capability report, the UE 120 may transmit at least a portion of the capability report, and the network node 110 may transmit a second portion of the configuration information after receiving the capability report.

In some aspects, the configuration information may indicate that the UE 120 is to perform synchronization-based LCH prioritization. For example, the configuration information may indicate that the UE 120 is to consider synchronization thresholds for one or more LCHs when performing logical channel prioritization. The configuration information may indicate configuration information for a set of one or more LCHs. For example, the configuration information may include LCH configurations for respective LCHs included in the set of one or more LCHs. The configuration information may indicate synchronization thresholds for respective LCHs of the set of one or more LCHs. For example, an LCH configuration for a given LCH may indicate one or more synchronization thresholds associated with the given LCH.

In some aspects, the configuration information may indicate that one or more LCHs are associated with priority-based, synchronization-based, and/or deadline-based scheduling or logical channel prioritization. For example, the configuration information may indicate that the LCH prioritization is a function of LCH priority, a delay threshold, and/or a synchronization threshold associated with a given LCH. For example, the configuration information may indicate that one or more LCHs are associated with synchronization-based scheduling and deadline-based scheduling. "Synchronization-based" scheduling or LCH prioritization may refer to scheduling LCHs based on, responsive to, or otherwise associated with a synchronization threshold and a transmission timing of associated data (for example, associated PDUs) that are transmitted via associated or related LCH(s).

For example, the configuration information may indicate that one or more LCHs are configured with one or more synchronization thresholds (for example, for associated or related LCHs). For example, the LCHs may be associated with one or more synchronization thresholds for synchronization-based scheduling of the LCHs. Additionally, the configuration information may indicate that the one or more LCHs are configured with a delay threshold for an RDB of a PDU. For example, the delay thresholds may be associated with an RDB for deadline-based scheduling of LCHs. Additionally, the configuration information may indicate that the one or more LCHs are configured with a priority (for example, an integer value indicating an LCH priority).

In some aspects, the configuration information may include an indication of one or more LCH correlations. For example, the configuration information may include one or more RRC parameters indicating the one or more LCH correlations (for example, the network node 110 may RRC configure LCH correlation between one or more LCHs). The one or more LCH correlations may indicate that two or more LCHs are to be synchronized in accordance with at least one synchronization threshold of the configured synchronization thresholds. For example, an LCH correlation may indicate that two or more LCHs are associated or related (for example, for synchronization purposes). As an example, an LCH correlation for a first LCH and a second LCH may indicate that if one or more PDUs is transmitted for the first LCH, then an associated one or more PDUs should be transmitted via the second LCH within an amount of time indicated by a synchronization threshold for the first LCH or the second LCH.

The UE 120 may configure itself based at least in part on the configuration information. In some aspects, the UE 120 may be configured to perform one or more operations described herein based at least in part on the configuration information.

In a fourth operation 620, the UE 120 may determine data to be included in an uplink communication based on, responsive to, or otherwise associated with synchronization information. For example, the UE 120 may schedule data from an uplink buffer based on, responsive to, or otherwise associated with LCH prioritization (for example, may allocate data to available uplink shared channel resources based on, responsive to, or otherwise associated with an LCH prioritization). The LCH prioritization may include deadline-based scheduling and/or synchronization-based scheduling. For example, the UE 120 may prioritize one or more LCHs in association with the synchronization thresholds associated with the LCH(s).

For example, as described elsewhere herein, the UE 120 may be configured with a first one or more LCHs that are associated with respective synchronization thresholds. The UE 120 may be configured with a second one or more LCHs that are associated with respective delay thresholds. The UE 120 may be associated with a third one or more LCHs that are associated with respective LCH priorities. The first one or more LCHs, the second one or more LCHs, and the third one or more LCHs may be the same one or more LCHs, may include one or more common LCHs, or may be different LCHs. The LCH prioritization performed by the UE 120 for scheduling data to be included in the uplink communication may be a function of the synchronization threshold(s), the RDB (and/or delay threshold(s)), and the LCH priorities.

When selecting data (for example, a packet or PDU) to be included in the available uplink resources, the UE 120 may determine whether corresponding data (for example, a corresponding packet or PDU) should be scheduled in accordance with a synchronization threshold. For example, the UE 120 may determine that two or more packets (or PDUs) are to be synchronized. In some aspects, the UE 120 may determine that the two or more packets (for example, two or more PDUs or two or more PDU sets) are to be synchronized based on, responsive to, or otherwise associated with a QoS flow associated with the two or more packets. For example, packets included in the data are associated with a reflective QoS flow indicating an identifier of a multi-modal service. The QoS flow may indicate one or more correlated LCHs for an LCH, of the set of LCHs, associated with the one or more packets. In other words, a multi-modal service ID may be indicated via the reflective QoS. "Reflective QoS" may refer to a QoS applied to an uplink packet that is implicitly derived from one or more downlink packets. For example, when the UE 120 receives a downlink packet that includes a reflective QoS indicator and a QoS flow identifier (QFI), the UE 120 may apply the same QoS associated with the downlink packet to an uplink packet with one or more attributes that match the downlink packet. If the UE 120 indicates that reflective QoS is supported during a PDU session establishment, then the multi-modal service ID may be applied to the UL QoS flows as well (for example, to uplink packets that match one or more attributes of a downlink packet that includes the multi-modal service ID).

As a result, the UE 120 may obtain an indication (for example, via the multi-modal service ID indicated via the reflective QoS) that there are certain QoS flows that are multi-modal mapped to correlated LCHs. For example, each packet may be identified via the QoS flow ID and a sequence number. Because a PDCP header of the packet may not be obfuscated or ciphered, a MAC component of the UE 120 may be enabled to access the PDCP sequence number to identify the QoS flow (and multi-modal service ID) associated with each packet.

As another example, the UE 120 may determine that the two or more packets (for example, two or more PDUs or two or more PDU sets) are to be synchronized based on, responsive to, or otherwise associated with an application layer-based indication. For example, data included in the uplink buffer may include one or more PDUs that include indications, in respective headers of the one or more PDUs, indicating that the one or more PDUs are to be synchronized in accordance with at least one synchronization threshold of the synchronization thresholds. For example, the one or more PDUs (for example, to be synchronized) may be associated with different LCHs (for example, correlated LCHs). For example, an application layer can indicate in the header of the PDUs an indication (for example, similar to a common service ID) to couple QoS flows such that, at the MAC layer, the QoS flows and/or LCHs are identified as multi-modal flows that are to be synchronized.

As another example, the UE 120 may determine that the two or more packets (for example, two or more PDUs or two or more PDU sets) are to be synchronized based on, responsive to, or otherwise associated with an uplink indicator. For example, the one or more LCH correlations may be indicated via an uplink indicator (for example, where the one or more LCH correlations indicate that two or more LCHs are to be synchronized in accordance with at least one synchronization threshold of the synchronization thresholds). Therefore, the UE 120 may identify that two or more LCHs are to be synchronized. The UE 120 may determine that the two or more packets are included in correlated LCHs. Therefore, the UE 120 may determine that the two or more packets (for example, two or more PDUs or two or more PDU sets) are to be synchronized. As another example, the UE 120 may determine that the two or more packets (for example, two or more PDUs or two or more PDU sets) are to be synchronized based on, responsive to, or otherwise associated with configured LCH correlation. For example, the configuration information (for example, one or more RRC parameters) may configure one or more LCH correlations (for example, for multi-modal service synchronization). The UE 120 may determine that the two or more packets are included in correlated LCHs (for example, based on, responsive to, or otherwise associated with the configuration information). Therefore, the UE 120 may determine that the two or more packets (for example, two or more PDUs or two or more PDU sets) are to be synchronized.

In some aspects, if no packets in one or more deadline-based LCHs (for example, LCHs configured with a delay threshold) have an RDB that does not satisfy (for example, that exceeds) the corresponding delay threshold, each of the LCHs (for example, including deadline-based LCHs, the synchronization-based LCHs, and any priority-based LCHs) may be scheduled using a strict priority scheme (for example, a priority based scheme that does not schedule based on, responsive to, or otherwise associated with delay) and synchronization-based scheduling.

For example, the UE 120 may fill available uplink resources (for example, uplink shared channel resources) following a similar operation as described in connection with FIG. 4. Additionally, when selecting data (for example, a packet or PDU) to be included in the available uplink resources, the UE 120 may determine whether a corresponding data (for example, a corresponding packet or PDU) should be scheduled in accordance with a synchronization threshold. For example, a first packet may be scheduled based on, responsive to, or otherwise associated with an LCH priority of an LCH associated with the first packet. The UE 120 may determine that the first packet is to be synchronized with one or more other packets. For example, the UE 120 may determine that the first LCH is associated with one or more correlated LCHs. A synchronization threshold associated with the first LCH may be associated with packets, including the first packet, that are associated with the first LCH and the one or more correlated LCHs.

For example, the first packet may be delivered at a first time, $T_1$. The $T_1$ may be a time at which the first packet is delivered to a modem of the UE 120 and/or a time at which the first packet is delivered to a PDCP component of the UE 120. A second packet (for example, included in a correlated LCH to the first LCH) may be delivered at a second time, $T_2$. The $T_2$ may be a time at which the second packet is delivered to a modem of the UE 120 and/or a time at which the second packet is delivered to a PDCP component of the UE 120. The UE 120 may compare a difference between $T_1$ and $T_2$ to a synchronization threshold associated with the first LCH to determine whether the second packet is to be scheduled before another packet in a higher priority LCH. For example, if the difference between $T_1$ and $T_2$ does not satisfy the synchronization threshold, then the UE 120 may schedule another packet based on, responsive to, or otherwise associated with strict LCH priority (for example, in a similar manner as described in connection with FIG. 4). If the difference between $T_1$ and $T_2$ satisfies the synchronization threshold, then the UE 120 may schedule the second packet (for example, before scheduling a packet from a higher priority LCH). The UE 120 may continue to schedule packets in a similar manner (for example, by strict priority and by synchronization-based scheduling for any scheduled packets) until the available uplink resources (for example, an available TB) have been filled.

If at least one packet of a deadline-based LCH has an RDB that exceeds the corresponding delay threshold, the uplink resources in an available TB may then be filled according to a procedure in which LCHs with packets that have exceeded their delay thresholds are scheduled first. For example, among the buffered packets for one or more LCHs, the UE 120 may first select a packet with the smallest RDB to fill the available TB. In other words, the UE 120 may first schedule LCH(s) with packets that have exceeded their delay thresholds. From the LCH(s) with packets that have exceeded their delay thresholds, the UE 120 may first schedule a packet with a smallest RDB for the available TB. If uplink resources are still available in the TB after scheduling the first packet, then the UE 120 may determine if the first packet is associated with any correlated LCHs. For example, the UE 120 may determine if the first packet (for example, a first PDU or a first PDU set) is to be synchronized with a second packet (for example, a second PDU or second PDU set), in a similar manner as described elsewhere herein. If the UE 120 determines that the first packet is to be synchronized with a second packet, then the UE 120 may schedule the second packet using synchronization-based scheduling.

For example, the UE 120 may determine whether a difference between a first time associated with the first packet and a second time associated with the second packet satisfies a synchronization threshold associated with the LCH of the first packet. If the difference between the first time associated with the first packet and the second time associated with the second packet satisfies the synchronization threshold associated with the LCH of the first packet, then the UE 120 may fill the available resources in the TB with the second packet. In other words, the UE 120 may If there is not enough room in the TB for the second packet, then the UE 120 may schedule a remaining portion of the packet in a next available transmission opportunity (for example, the next time logical channel prioritization is triggered). If the difference between the first time associated with the first packet and the second time associated with the second packet does not satisfy the synchronization threshold associated with the LCH of the first packet, then the UE 120 may refrain from scheduling the second packet.

In other words, the uplink resources of the TB may be allocated to a first one or more packets having RDBs that satisfy delay thresholds of respective LCHs associated with the first one or more packets. Additionally, the uplink resources of the TB may be allocated to any packets, associated with the first one or more packets in accordance with a multi-modal service, in association with synchronization thresholds associated with the respective LCHs associated with the first one or more packets. In this way, the UE 120 may ensure that packets or PDUs with small RDBs are transmitted first and that any packets that are to be synchronized with those packets are transmitted within an amount of time that satisfies the synchronization threshold(s) (for example, thereby reducing a likelihood of a detectable lack of synchronization by a user).

If there is remaining uplink resources in the TB after scheduling the first packet and the correlated packet (for example, using synchronization-based scheduling), then the UE 120 may selects the packet (for example, the PDU) with the second smallest RDB to fill the remaining resource in the TB. The UE 120 continues selecting packets or PDUs to fill the TB based on, responsive to, or otherwise associated with the packer having the next smallest residual delay budget and/or a correlated packet for synchronization until each PDU having a RDB that exceeds the corresponding delay threshold for the LCH of the PDU (for example, until no PDUs have a residual delay budget that is less than their delay thresholds) or until the TB is completely filled. If there are remaining uplink resources left in the TB after each PDU having an RDB that exceeds the corresponding delay threshold has been applied to the TB, then the UE 120 may schedule the remaining PDUs of LCHs based on, responsive to, or otherwise associated with a strict priority operation (for example, in a similar manner as described elsewhere herein).

In some aspects, the UE 120 may determine a delay budget (for example, a packet delay budget (PDB)) for packets associated with synchronization (for example, associated with a multi-modal service) by taking a synchronization error into account. For example, a packet, included in the data, may associated with a PDB. The packet may be associated with an LCH that is associated with a synchronization threshold. The UE 120 may prioritize the LCH using a modified PDB (or a dynamic PDB) that is modified in association with the PDB and the synchronization threshold. For example, rather than using a static PDB for scheduling or prioritizing the LCHs, the UE 120 may update PDBs of some packets based on, responsive to, or otherwise associated with a synchronization error. For example, a packet A may have a transmission deadline (for example, defined by a first PDB) at a time $T_A$, a packet B may have a transmission deadline (for example, defined by a second PDB) at a time $T_B$, and a synchronization error (for example, defined by a synchronization threshold) between the packet A and the packet B may be D. If a difference between $T_A$ and $T_B$ is greater than D, then one of the transmission deadlines for packet A and/or packet B may be modified. For example, the UE 120 may modify a PDB of the packet A and/or packet B to ensure that the difference between $T_A$ and $T_B$ is less than or equal to D. For example, the UE 120 may modify the second PDB of the packet B so that that transmission deadline of packet B is $T_A$+D. If difference between $T_A$ and $T_B$ is less than or equal to D, then the UE 120 may refrain from modifying a PDB of the packet A or the packet B. In such examples, the UE 120 may perform logical channel prioritization and scheduling of the packets (for example, after modifying any PDBs or transmission deadlines in accordance with synchronization information) using strict priority and deadline-based scheduling, as described elsewhere herein.

In a fifth operation 625, the UE 120 may transmit, and the network node 110 may receive, an uplink communication. The uplink communication may indicate data (for example, included in a TB). The data may be transmitted via one or more LCHs, from the set of configured LCHs, that are prioritized in association with one or more synchronization thresholds, as described in more detail elsewhere herein. The data may be XR data, VR data, and/or data associated with a multi-modal service or application. For example, the UE 120 may transmit the TB that is scheduled and/or allocated as described in connection with the fourth operation 620. As a result, the UE 120 may ensure that packets or PDUs for a multi-modal service or application are synchronized. This may reduce a likelihood of a noticeable lack of synchronization by a user, thereby improving a user experience associated with the multi-modal service or application.

Figure 7:
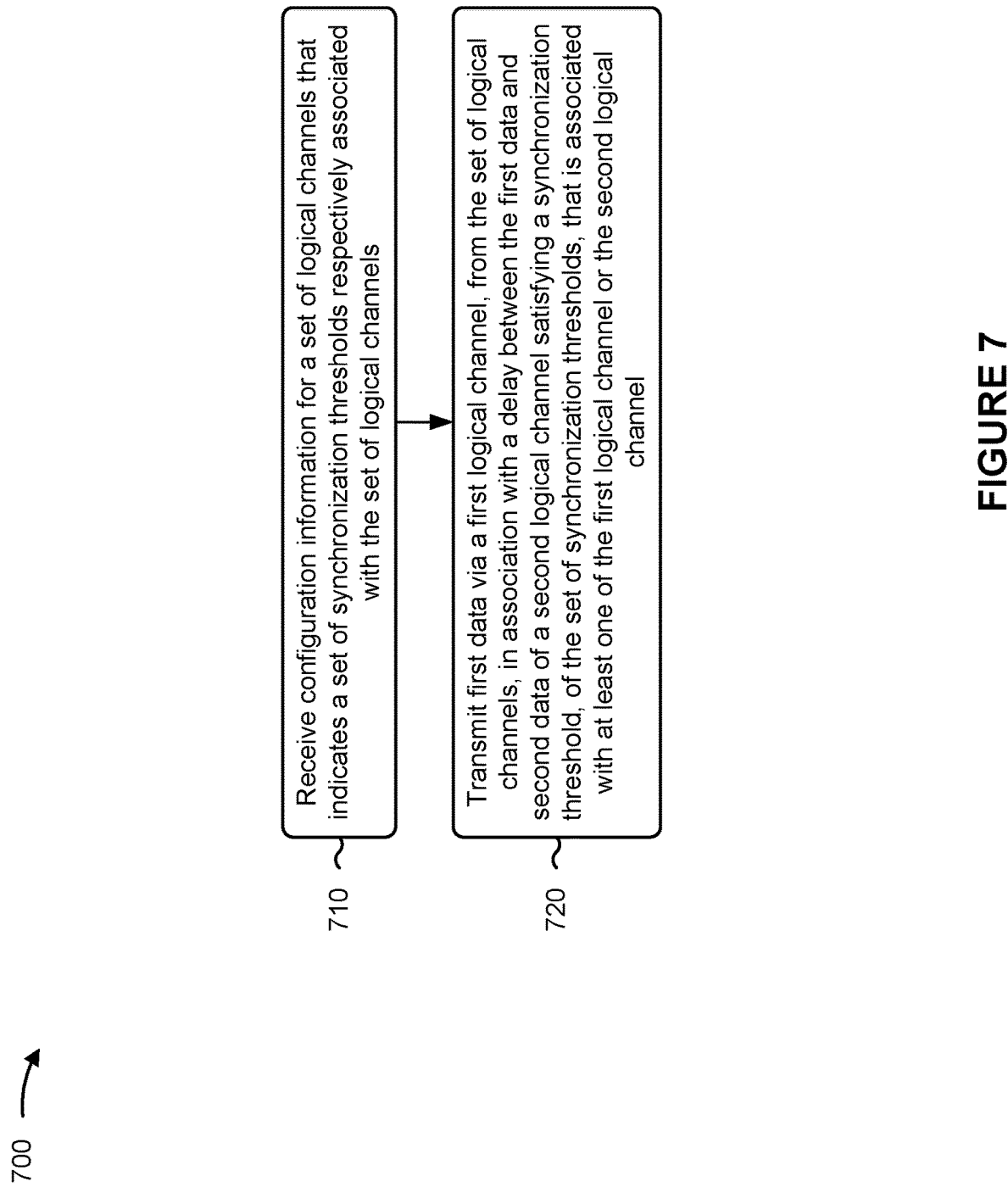
FIG. 7 is a flowchart illustrating an example process performed, for example, at a UE or an apparatus of a UE that supports logical channel prioritization for synchronization in accordance with the present disclosure.

FIG. 7 is a flowchart illustrating an example process 700 performed, for example, at a UE or an apparatus of a UE that supports logical channel prioritization for synchronization in accordance with the present disclosure. Example process 700 is an example where the apparatus or the UE (for example, the UE 120) performs operations associated with logical channel prioritization for synchronization.

As shown in FIG. 7, in some aspects, process 700 may include receiving configuration information for a set of logical channels that indicates a set of synchronization thresholds respectively associated with the set of logical channels (block 710). For example, the UE (such as by using communication manager 140 or reception component 902, depicted in FIG. 9) may receive configuration information for a set of logical channels that indicates a set of synchronization thresholds respectively associated with the set of logical channels, as described above.

As further shown in FIG. 7, in some aspects, process 700 may include transmitting first data via a first logical channel, from the set of logical channels, in association with a delay between the first data and second data of a second logical channel satisfying a synchronization threshold, of the set of synchronization thresholds, that (block 720). For example, the UE (such as by using communication manager 140 or transmission component 904, depicted in FIG. 9) may transmit first data via a first logical channel, from the set of logical channels, in association with a delay between the first data and second data of a second logical channel satisfying a synchronization threshold, of the set of synchronization thresholds, that, as described above.

Process 700 may include additional aspects, such as any single aspect or any combination of aspects described below or in connection with one or more other processes described elsewhere herein.

In a first additional aspect, the set of synchronization thresholds is associated with one or more multi-modal services.

In a second additional aspect, alone or in combination with the first aspect, the first data is associated with one or more packets that are associated with a reflective quality of service (QoS), a parameter of the reflective QoS indicating an identifier of a multi-modal service of the one or more multi-modal services, the identifier indicating that the first logical channel and the second logical channel are correlated logical channels.

In a third additional aspect, alone or in combination with one or more of the first and second aspects, the synchronization threshold is associated with the one or more packets.

In a fourth additional aspect, alone or in combination with one or more of the first through third aspects, the configuration information indicates respective delay thresholds for the set of logical channels, the delay thresholds being associated with a residual delay budget.

In a fifth additional aspect, alone or in combination with one or more of the first through fourth aspects, the configuration information indicates respective logical channel priority values for the set of logical channels.

In a sixth additional aspect, alone or in combination with one or more of the first through fifth aspects, the first data is associated with a first one or more packets associated with the first logical channel and the second data is associated with a second one or more packets associated with the second logical channel, the first logical channel being associated with the synchronization threshold, and the first logical channel being associated with the second logical channel in accordance with a multi-modal service, and transmitting the first data includes transmitting the first one or more packets in association with prioritizing the first logical channel with respect to one or more higher priority logical channels, included in the set of logical channels, in association with the delay satisfying the synchronization threshold.

In a seventh additional aspect, alone or in combination with one or more of the first through sixth aspects, the delay is between a first time associated with the first one or more packets and a second time associated with the second one or more packets, and the first time is associated with the first one or more packets arriving at a PDCP component of the UE and the second time is associated with the second one or more packets arriving at the PDCP component.

In an eighth additional aspect, alone or in combination with one or more of the first through seventh aspects, process 700 includes scheduling the second one or more packets for transmission in association with a logical channel priority value associated with the second logical channel, the logical channel priority value being indicated by the configuration information.

In a ninth additional aspect, alone or in combination with one or more of the first through eighth aspects, transmitting the first data includes the first data via one or more uplink resources, the one or more uplink resources being allocated to: the second data in association with the second data having a residual delay budget that satisfies a delay threshold of the second logical channel, and the first data in association with the first logical channel being correlated to the second logical channel.

In a tenth additional aspect, alone or in combination with one or more of the first through ninth aspects, the first logical channel is correlated to the second logical channel in association with a multi-modal service.

In an eleventh additional aspect, alone or in combination with one or more of the first through tenth aspects, transmitting the first data includes transmitting data, including the first data and the second data, via one or more uplink resources, the one or more uplink resources being allocated to: a first one or more packets, associated with the first data, having residual delay budget that satisfy delay thresholds of respective logical channels associated with the first one or more packets, and/or any packets, associated with the first one or more packets in accordance with a multi-modal service, in association with synchronization thresholds associated with the respective logical channels associated with the first one or more packets.

In a twelfth additional aspect, alone or in combination with one or more of the first through eleventh aspects, the first data and the second data includes one or more PDUs that include indications, in respective headers of the one or more PDUs, indicating that the one or more PDUs are to be synchronized in accordance with the synchronization threshold, the one or more PDUs being associated with different logical channels.

In a thirteenth additional aspect, alone or in combination with one or more of the first through twelfth aspects, the first logical channel and the second logical channel are correlated in association with an uplink indicator identifying a logical channel correlation associated with the first logical channel and the second logical channel, the logical channel correlation indicating that the first logical channel and the second logical channel are to be synchronized in accordance with the synchronization threshold.

In a fourteenth additional aspect, alone or in combination with one or more of the first through thirteenth aspects, the configuration information includes an indication of a logical channel correlation between the first logical channel and the second logical channel, the channel correlation indicating that the first logical channel and the second logical channel are to be synchronized in accordance with the synchronization threshold.

In a fifteenth additional aspect, alone or in combination with one or more of the first through fourteenth aspects, the first data includes two or more PDU sets that are to be synchronized in accordance with the synchronization threshold.

In a sixteenth additional aspect, alone or in combination with one or more of the first through fifteenth aspects, a packet, associated with the first data, is associated with a packet delay budget, the packet being associated with the first logical channel, and transmitting the first data includes transmitting the packet in accordance with prioritizing the first logical channel using a modified packet delay budget that is modified in association with the packet delay budget and the synchronization threshold.

In a seventeenth additional aspect, alone or in combination with one or more of the first through sixteenth aspects, the first data includes XR data.

In an eighteenth additional aspect, alone or in combination with one or more of the first through seventeenth aspects, the first data is associated with one or more packets associated with one or more multi-modal services.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
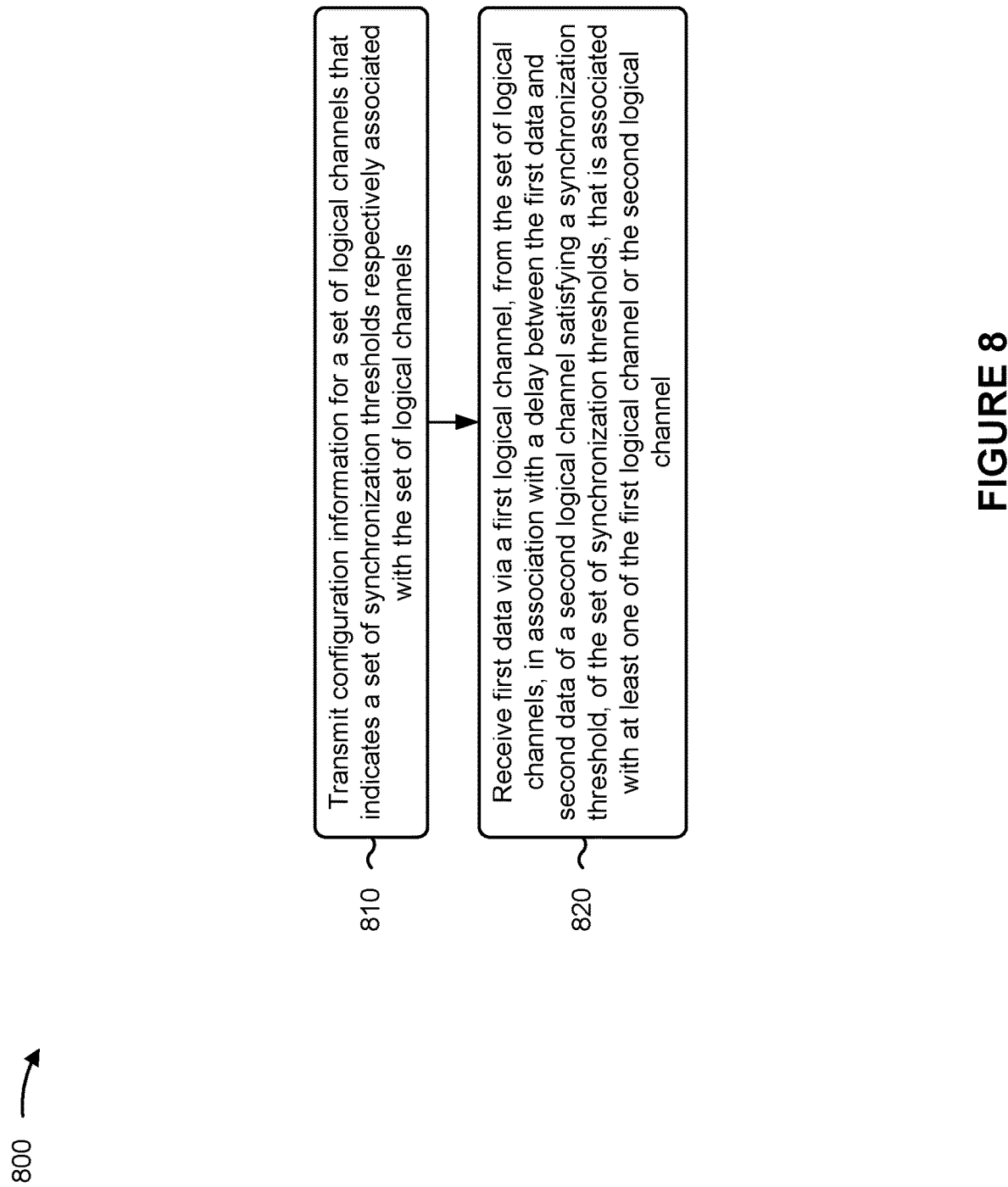
FIG. 8 is a flowchart illustrating an example process performed, for example, at a network node or an apparatus of a network node that supports logical channel prioritization for synchronization in accordance with the present disclosure.

FIG. 8 is a flowchart illustrating an example process 800 performed, for example, at a network node or an apparatus of a network node that supports logical channel prioritization for synchronization in accordance with the present disclosure. Example process 800 is an example where the apparatus or the network node (for example, network node 110) performs operations associated with logical channel prioritization for synchronization.

As shown in FIG. 8, in some aspects, process 800 may include transmitting configuration information for a set of logical channels that indicates a set of synchronization thresholds respectively associated with the set of logical channels (block 810). For example, the network node (such as by using communication manager 150 or transmission component 1004, depicted in FIG. 10) may transmit configuration information for a set of logical channels that indicates a set of synchronization thresholds respectively associated with the set of logical channels, as described above.

As further shown in FIG. 8, in some aspects, process 800 may include receiving first data via a first logical channel, from the set of logical channels, in association with a delay between the first data and second data of a second logical channel satisfying a synchronization threshold, of the set of synchronization thresholds, that (block 820). For example, the network node (such as by using communication manager 150 or reception component 1002, depicted in FIG. 10) may receive first data via a first logical channel, from the set of logical channels, in association with a delay between the first data and second data of a second logical channel satisfying a synchronization threshold, of the set of synchronization thresholds, that, as described above.

Process 800 may include additional aspects, such as any single aspect or any combination of aspects described below or in connection with one or more other processes described elsewhere herein.

In a first additional aspect, the set of synchronization thresholds is associated with one or more multi-modal services.

In a second additional aspect, alone or in combination with the first aspect, the first data is associated with one or more packets that are associated with a reflective quality of service (QoS), a parameter of the reflective QoS indicating an identifier of a multi-modal service of the one or more multi-modal services, the identifier indicating that the first logical channel and the second logical channel are correlated logical channels.

In a third additional aspect, alone or in combination with one or more of the first and second aspects, the synchronization threshold is associated with the one or more packets.

In a fourth additional aspect, alone or in combination with one or more of the first through third aspects, the configuration information indicates respective delay thresholds for the set of logical channels, the delay thresholds being associated with a residual delay budget.

In a fifth additional aspect, alone or in combination with one or more of the first through fourth aspects, the configuration information indicates respective logical channel priority values for the set of logical channels.

In a sixth additional aspect, alone or in combination with one or more of the first through fifth aspects, the first data is associated with a first one or more packets associated with the first logical channel and the second data is associated with a second one or more packets associated with the second logical channel, the first logical channel being associated with the synchronization threshold, and the first logical channel being associated with the second logical channel in accordance with a multi-modal service, and receiving the first data includes receiving the first one or more packets in association with prioritizing the first logical channel with respect to one or more higher priority logical channels, included in the set of logical channels, in association with the delay satisfying the synchronization threshold.

In a seventh additional aspect, alone or in combination with one or more of the first through sixth aspects, receiving the first data via one or more uplink resources, the one or more uplink resources being allocated to: the second data in association with the second data having a residual delay budget that satisfies a delay threshold of the second logical channel, and the first data in association with the first logical channel being correlated to the second logical channel.

In an eighth additional aspect, alone or in combination with one or more of the first through seventh aspects, the first logical channel is correlated to the second logical channel in association with a multi-modal service.

In a ninth additional aspect, alone or in combination with one or more of the first through eighth aspects, receiving data, including the first data and the second data, via one or more uplink resources, the one or more uplink resources being allocated to: a first one or more packets, associated with the first data, having residual delay budget that satisfy delay thresholds of respective logical channels associated with the first one or more packets, and/or any packets, associated with the first one or more packets in accordance with a multi-modal service, in association with synchronization thresholds associated with the respective logical channels associated with the first one or more packets.

In a tenth additional aspect, alone or in combination with one or more of the first through ninth aspects, the first data and the second data includes one or more PDUs that include indications, in respective headers of the one or more PDUs, indicating that the one or more PDUs are to be synchronized in accordance with the synchronization threshold, the one or more PDUs being associated with different logical channels.

In an eleventh additional aspect, alone or in combination with one or more of the first through tenth aspects, the first logical channel and the second logical channel are correlated in association with an uplink indicator identifying a logical channel correlation associated with the first logical channel and the second logical channel, the logical channel correlation indicating that the first logical channel and the second logical channel are to be synchronized in accordance with the synchronization threshold.

In a twelfth additional aspect, alone or in combination with one or more of the first through eleventh aspects, the configuration information includes an indication of a logical channel correlation between the first logical channel and the second logical channel, the channel correlation indicating that the first logical channel and the second logical channel are to be synchronized in accordance with the synchronization threshold.

In a thirteenth additional aspect, alone or in combination with one or more of the first through twelfth aspects, the first data includes two or more PDU sets that are to be synchronized in accordance with the synchronization threshold.

In a fourteenth additional aspect, alone or in combination with one or more of the first through thirteenth aspects, a packet, associated with the first data, is associated with a packet delay budget, the packet being associated with the first logical channel, and receiving the first data includes receiving the packet in accordance with prioritizing the first logical channel using a modified packet delay budget that is modified in association with the packet delay budget and the synchronization threshold.

In a fifteenth additional aspect, alone or in combination with one or more of the first through fourteenth aspects, the first data and/or the second data includes XR data.

In a sixteenth additional aspect, alone or in combination with one or more of the first through fifteenth aspects, the first data and/or the second data includes one or more packets associated with one or more multi-modal services.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
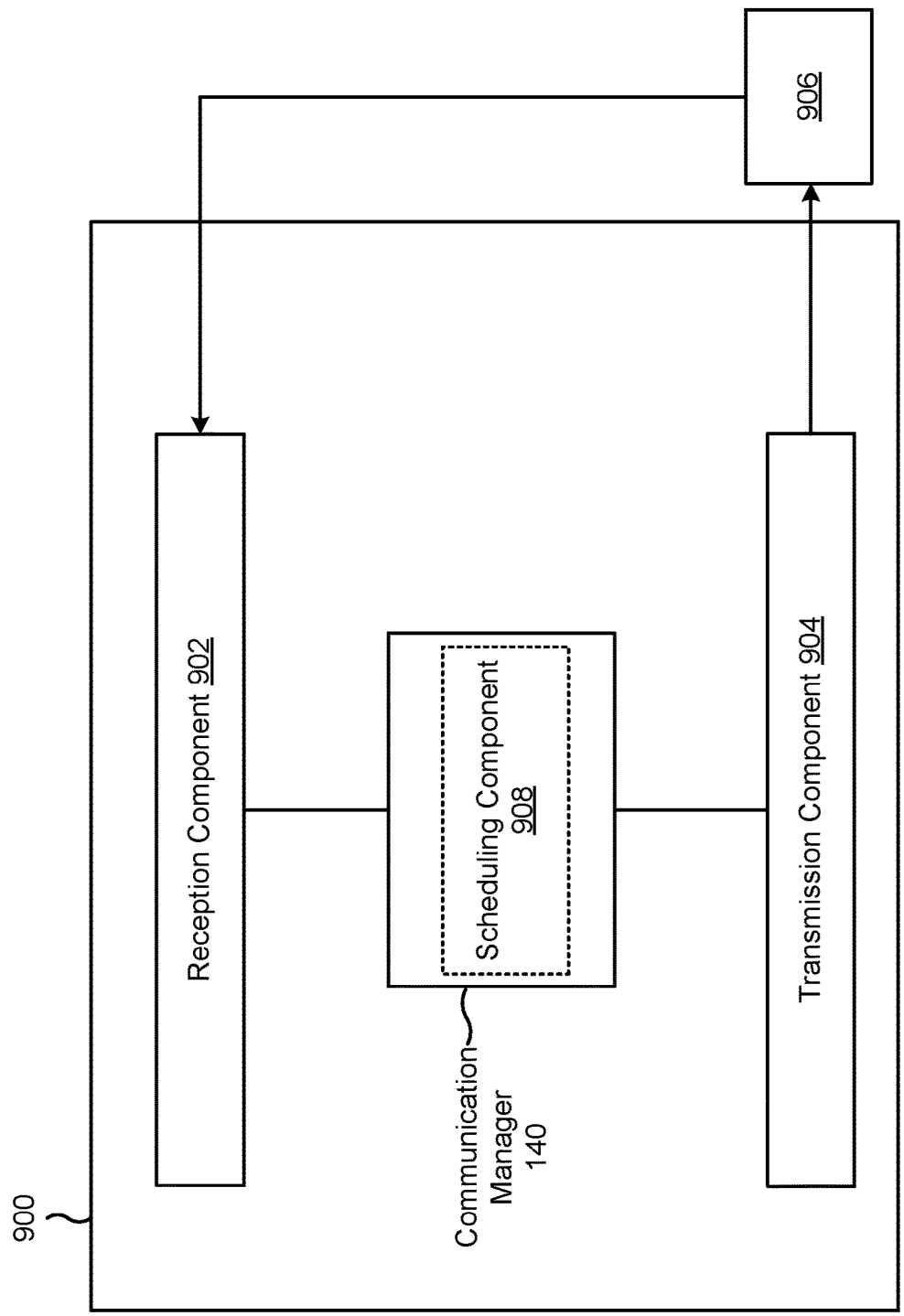
FIG. 9 is a diagram of an example apparatus for wireless communication that supports logical channel prioritization for synchronization in accordance with the present disclosure.

FIG. 9 is a diagram of an example apparatus 900 for wireless communication that supports logical channel prioritization for synchronization in accordance with the present disclosure. The apparatus 900 may be a UE, or a UE may include the apparatus 900. In some aspects, the apparatus 900 includes a reception component 902, a transmission component 904, and a communication manager 140, which may be in communication with one another (for example, via one or more buses). As shown, the apparatus 900 may communicate with another apparatus 906 (such as a UE, a network node, or another wireless communication device) using the reception component 902 and the transmission component 904.

In some aspects, the apparatus 900 may be configured to and/or operable to perform one or more operations described herein in connection with FIG. 6. Additionally or alternatively, the apparatus 900 may be configured to and/or operable to perform one or more processes described herein, such as process 700 of FIG. 7. In some aspects, the apparatus 900 may include one or more components of the UE described above in connection with FIG. 2.

The reception component 902 may receive communications, such as reference signals, control information, and/or data communications, from the apparatus 906. The reception component 902 may provide received communications to one or more other components of the apparatus 900, such as the communication manager 140. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, one or more modems, one or more demodulators, one or more MIMO detectors, one or more receive processors, one or more controllers/processors, and/or one or more memories of the UE described above in connection with FIG. 2.

The transmission component 904 may transmit communications, such as reference signals, control information, and/or data communications, to the apparatus 906. In some aspects, the communication manager 140 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, one or more modems, one or more modulators, one or more transmit MIMO processors, one or more transmit processors, one or more controllers/processors, and/or one or more memories of the UE described above in connection with FIG. 2. In some aspects, the transmission component 904 may be co-located with the reception component 902 in one or more transceivers.

The communication manager 140 may receive or may cause the reception component 902 to receive configuration information for a set of logical channels that indicates a set of synchronization thresholds respectively associated with the set of logical channels. The communication manager 140 may transmit or may cause the transmission component 904 to transmit first data via a first logical channel, from the set of logical channels, in association with a delay between the first data and second data of a second logical channel satisfying a synchronization threshold, of the set of synchronization thresholds, that. In some aspects, the communication manager 140 may perform one or more operations described elsewhere herein as being performed by one or more components of the communication manager 140.

The communication manager 140 may include one or more controllers/processors, one or more memories, of the UE described above in connection with FIG. 2. In some aspects, the communication manager 140 includes a set of components, such as a scheduling component 908, among other examples. Alternatively, the set of components may be separate and distinct from the communication manager 140. In some aspects, one or more components of the set of components may include or may be implemented within one or more controllers/processors, one or more memories, of the UE described above in connection with FIG. 2. Additionally or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 902 may receive configuration information for a set of logical channels that indicates a set of synchronization thresholds respectively associated with the set of logical channels. The transmission component 904 may transmit first data via a first logical channel, from the set of logical channels, in association with a delay between the first data and second data of a second logical channel satisfying a synchronization threshold, of the set of synchronization thresholds, that.

The scheduling component 908 may schedule the second one or more packets for transmission in association with a logical channel priority value associated with the second logical channel, the logical channel priority value being indicated by the configuration information.

The quantity and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
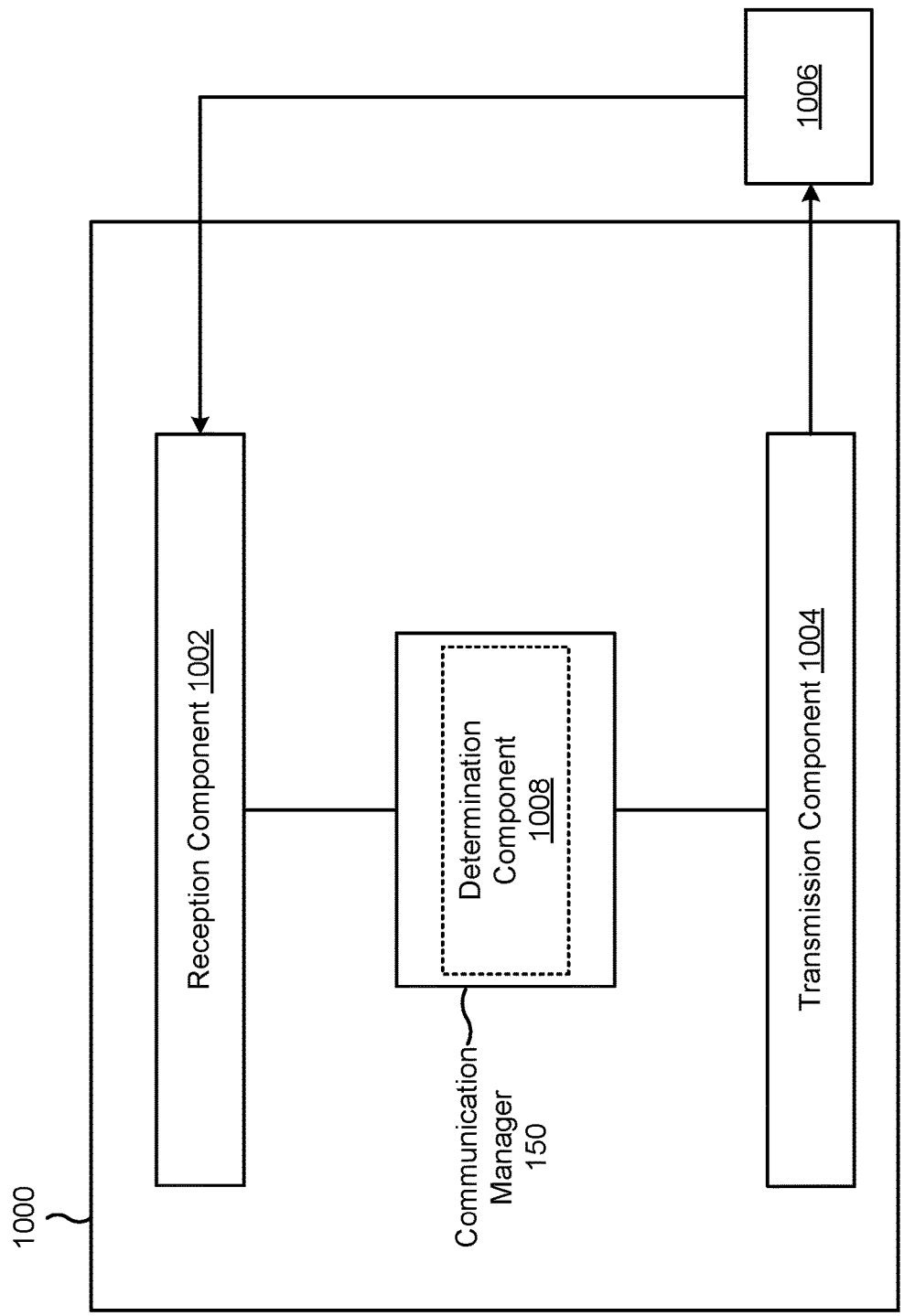
FIG. 10 is a diagram of an example apparatus for wireless communication that supports logical channel prioritization for synchronization in accordance with the present disclosure.

FIG. 10 is a diagram of an example apparatus 1000 for wireless communication that supports logical channel prioritization for synchronization in accordance with the present disclosure. The apparatus 1000 may be a network node, or a network node may include the apparatus 1000. In some aspects, the apparatus 1000 includes a reception component 1002, a transmission component 1004, and a communication manager 150, which may be in communication with one another (for example, via one or more buses). As shown, the apparatus 1000 may communicate with another apparatus 1006 (such as a UE, a network node, or another wireless communication device) using the reception component 1002 and the transmission component 1004.

In some aspects, the apparatus 1000 may be configured to and/or operable to perform one or more operations described herein in connection with FIG. 6. Additionally or alternatively, the apparatus 1000 may be configured to and/or operable to perform one or more processes described herein, such as process 800 of FIG. 8. In some aspects, the apparatus 1000 may include one or more components of the network node described above in connection with FIG. 2.

The reception component 1002 may receive communications, such as reference signals, control information, and/or data communications, from the apparatus 1006. The reception component 1002 may provide received communications to one or more other components of the apparatus 1000, such as the communication manager 150. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, one or more modems, one or more demodulators, one or more MIMO detectors, one or more receive processors, one or more controllers/processors, and/or one or more memories of the network node described above in connection with FIG. 2.

The transmission component 1004 may transmit communications, such as reference signals, control information, and/or data communications, to the apparatus 1006. In some aspects, the communication manager 150 may generate communications and may transmit the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, one or more modems, one or more modulators, one or more transmit MIMO processors, one or more transmit processors, one or more controllers/processors, and/or one or more memories of the network node described above in connection with FIG. 2. In some aspects, the transmission component 1004 may be co-located with the reception component 1002 in one or more transceivers.

The communication manager 150 may transmit or may cause the transmission component 1004 to transmit configuration information for a set of logical channels that indicates a set of synchronization thresholds respectively associated with the set of logical channels. The communication manager 150 may receive or may cause the reception component 1002 to receive first data via a first logical channel, from the set of logical channels, in association with a delay between the first data and second data of a second logical channel satisfying a synchronization threshold, of the set of synchronization thresholds, that. In some aspects, the communication manager 150 may perform one or more operations described elsewhere herein as being performed by one or more components of the communication manager 150.

The communication manager 150 may include one or more controllers/processors, one or more memories, one or more schedulers, and/or one or more communication units of the network node described above in connection with FIG. 2. In some aspects, the communication manager 150 includes a set of components, such as a determination component 1008, among other examples. Alternatively, the set of components may be separate and distinct from the communication manager 150. In some aspects, one or more components of the set of components may include or may be implemented within one or more controllers/processors, one or more memories, one or more schedulers, and/or one or more communication units of the network node described above in connection with FIG. 2. Additionally or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The transmission component 1004 may transmit configuration information for a set of logical channels that indicates a set of synchronization thresholds respectively associated with the set of logical channels. The reception component 1002 may receive first data via a first logical channel, from the set of logical channels, in association with a delay between the first data and second data of a second logical channel satisfying a synchronization threshold, of the set of synchronization thresholds, that.

The determination component 1008 may determine the synchronization thresholds for the respective logical channels of the set of logical channels. The determination component 1008 may determine the synchronization thresholds based on, responsive to, or otherwise associated with a multi-modal service or application.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of some Aspects of the present disclosure:

Aspect 1: A method for wireless communication by a user equipment (UE), comprising: receiving configuration information for a set of logical channels that indicates a set of synchronization thresholds respectively associated with the set of logical channels; and transmitting first data via a first logical channel, from the set of logical channels, in association with a delay between the first data and second data of a second logical channel satisfying a synchronization threshold, of the set of synchronization thresholds, that is associated with at least one of the first logical channel or the second logical channel.

Aspect 2: The method of Aspect 1, wherein the set of synchronization thresholds are associated with one or more multi-modal services.

Aspect 3: The method of Aspect 2, wherein the first data is associated with one or more packets that are associated with a reflective quality of service (QoS), a parameter of the reflective QoS indicating an identifier of a multi-modal service of the one or more multi-modal services, the identifier indicating that the first logical channel and the second logical channel are correlated logical channels.

Aspect 4: The method of Aspect 3, wherein a synchronization threshold associated with the logical channel is associated with packets, including the one or more packets, that are associated with the logical channel and the one or more correlated logical channels.

Aspect 5: The method of any of Aspects 1-4, wherein the configuration information indicates respective delay thresholds for the set of logical channels, the delay thresholds being associated with a residual delay budget.

Aspect 6: The method of any of Aspects 1-5, wherein the configuration information indicates respective logical channel priority values for the set of logical channels.

Aspect 7: The method of any of Aspects 1-6, wherein: the first data is associated with a first one or more packets associated with the first logical channel and the second data is associated with a second one or more packets associated with the second logical channel, the first logical channel being associated with the synchronization threshold, and the first logical channel being associated with the second logical channel in accordance with a multi-modal service; and transmitting the first data comprises transmitting the first one or more packets in association with prioritizing the first logical channel with respect to one or more higher priority logical channels, included in the set of logical channels, in association with the delay satisfying the synchronization threshold.

Aspect 8: The method of Aspect 7, wherein: the delay is between a first time associated with the first one or more packets and a second time associated with the second one or more packets, and the first time is associated with the first one or more packets arriving at a packet data convergence protocol (PDCP) component of the UE and the second time is associated with the second one or more packets arriving at the PDCP component.

Aspect 9: The method of any of Aspects 7-8, further comprising: scheduling the second one or more packets for transmission in association with a logical channel priority value associated with the second logical channel, the logical channel priority value being indicated by the configuration information.

Aspect 10: The method of any of Aspects 1-9, wherein transmitting the first data comprises: transmitting the first data via one or more uplink resources, the one or more uplink resources being allocated to: the second data in association with the second data having a residual delay budget that satisfies a delay threshold of the second logical channel, and the first data in association with the first logical channel being correlated to the second logical channel.

Aspect 11: The method of Aspect 10, wherein the first logical channel is correlated to the second logical channel in association with a multi-modal service.

Aspect 12: The method of any of Aspects 1-11, wherein transmitting the first data comprises: transmitting data, including the first data and the second data, via one or more uplink resources, the one or more uplink resources being allocated to: a first one or more packets, associated with the first data, having residual delay budget that satisfy delay thresholds of respective logical channels associated with the first one or more packets, or any packets, associated with the first one or more packets in accordance with a multi-modal service, in association with synchronization thresholds associated with the respective logical channels associated with the first one or more packets.

Aspect 13: The method of any of Aspects 1-12, wherein the first data and the second data includes one or more protocol data units (PDUs) that include indications, in respective headers of the one or more PDUs, indicating that the one or more PDUs are to be synchronized in accordance with the synchronization threshold, the one or more PDUs being associated with different logical channels.

Aspect 14: The method of any of Aspects 1-13, wherein the first logical channel and the second logical channel are correlated in association with an uplink indicator identifying a logical channel correlation associated with the first logical channel and the second logical channel, the logical channel correlation indicating that the first logical channel and the second logical channel are to be synchronized in accordance with the synchronization threshold.

Aspect 15: The method of any of Aspects 1-14, wherein the configuration information includes an indication of a logical channel correlation between the first logical channel and the second logical channel, the channel correlation indicating that the first logical channel and the second logical channel are to be synchronized in accordance with the synchronization threshold.

Aspect 16: The method of any of Aspects 1-15, wherein the first data includes two or more protocol data unit (PDU) sets that are to be synchronized in accordance with the synchronization threshold.

Aspect 17: The method of any of Aspects 1-16, wherein a packet, associated with the first data, is associated with a packet delay budget, the packet being associated with the first logical channel, and wherein transmitting the first data comprises: transmitting the packet in accordance with prioritizing the first logical channel using a modified packet delay budget that is modified in association with the packet delay budget and the synchronization threshold.

Aspect 18: The method of any of Aspects 1-17, wherein the first data includes extended reality (XR) data.

Aspect 19: The method of any of Aspects 1-18, wherein the first data is associated with one or more multi-modal services.

Aspect 20: A method for wireless communication by a network node, comprising: transmitting configuration information for a set of logical channels that indicates a set of synchronization thresholds respectively associated with the set of logical channels; and receiving first data via a first logical channel, from the set of logical channels, in association with a delay between the first data and second data of a second logical channel satisfying a synchronization threshold, of the set of synchronization thresholds, that is associated with at least one of the first logical channel or the second logical channel.

Aspect 21: The method of Aspect 20, wherein the set of synchronization thresholds are associated with one or more multi-modal services.

Aspect 22: The method of Aspect 21, wherein the first data is associated with one or more packets that are associated with a reflective quality of service (QoS), a parameter of the reflective QoS indicating an identifier of a multi-modal service of the one or more multi-modal services, the identifier indicating that the first logical channel and the second logical channel are correlated logical channels.

Aspect 23: The method of Aspect 22, wherein the synchronization threshold is associated with the one or more packets.

Aspect 24: The method of any of Aspects 20-23, wherein the configuration information indicates respective delay thresholds for the set of logical channels, the delay thresholds being associated with a residual delay budget.

Aspect 25: The method of any of Aspects 20-24, wherein the configuration information indicates respective logical channel priority values for the set of logical channels.

Aspect 26: The method of any of Aspects 20-25, wherein: the first data is associated with a first one or more packets associated with the first logical channel and the second data is associated with a second one or more packets associated with the second logical channel, the first logical channel being associated with the synchronization threshold, and the first logical channel being associated with the second logical channel in accordance with a multi-modal service; and wherein receiving the first data comprises receiving the first one or more packets in association with prioritizing the first logical channel with respect to one or more higher priority logical channels, included in the set of logical channels, in association with the delay satisfying the synchronization threshold.

Aspect 27: The method of any of Aspects 20-26, wherein receiving the first data comprises: receiving the first data via one or more uplink resources, the one or more uplink resources being allocated to: the second data in association with the second data having a residual delay budget that satisfies a delay threshold of the second logical channel, and the first data in association with the first logical channel being correlated to the second logical channel.

Aspect 28: The method of Aspect 27, wherein the first logical channel is correlated to the second logical channel in association with a multi-modal service.

Aspect 29: The method of any of Aspects 20-28, wherein receiving the first data comprises: receiving the first data via one or more uplink resources, the one or more uplink resources being allocated to: a first one or more packets, associated with the first data, having residual delay budget that satisfy delay thresholds of respective logical channels associated with the first one or more packets, or any packets, associated with the first one or more packets in accordance with a multi-modal service, in association with synchronization thresholds associated with the respective logical channels associated with the first one or more packets.

Aspect 30: The method of any of Aspects 20-29, wherein the first data includes one or more protocol data units (PDUs) that include indications, in respective headers of the one or more PDUs, indicating that the one or more PDUs are to be synchronized in accordance with at least one synchronization threshold of the synchronization thresholds, the one or more PDUs being associated with different logical channels.

Aspect 31: The method of any of Aspects 20-30, wherein one or more logical channel correlations are indicated via an uplink indicator, the one or more logical channel correlations indicating that two or more logical channels are to be synchronized in accordance with at least one synchronization threshold of the synchronization thresholds.

Aspect 32: The method of any of Aspects 20-31, wherein the configuration information includes an indication of one or more logical channel correlations, the one or more logical channel correlations indicating that two or more logical channels are to be synchronized in accordance with the synchronization threshold.

Aspect 33: The method of any of Aspects 20-32, wherein the first data includes two or more protocol data unit (PDU) sets that are to be synchronized in accordance with the synchronization threshold.

Aspect 34: The method of any of Aspects 20-33, wherein a packet, associated with the first data, is associated with a packet delay budget, the packet being associated with the first logical channel, and wherein receiving the first data comprises: receiving the packet in accordance with the first logical channel being prioritized using a modified packet delay budget that is modified in association with the packet delay budget and the synchronization threshold.

Aspect 35: The method of any of Aspects 20-34, wherein the first data includes extended reality (XR) data.

Aspect 36: The method of any of Aspects 20-35, wherein the first data is associated with one or more multi-modal services.

Aspect 37: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-36.

Aspect 38: An apparatus for wireless communication at a device, the apparatus comprising one or more memories and one or more processors coupled to the one or more memories, the one or more processors configured to cause the device to perform the method of one or more of Aspects 1-36.

Aspect 39: An apparatus for wireless communication, the apparatus comprising at least one means for performing the method of one or more of Aspects 1-36.

Aspect 40: A non-transitory computer-readable medium storing code for wireless communication, the code comprising instructions executable by one or more processors to perform the method of one or more of Aspects 1-36.

Aspect 41: A non-transitory computer-readable medium storing a set of instructions for wireless communication, the set of instructions comprising one or more instructions that, when executed by one or more processors of a device, cause the device to perform the method of one or more of Aspects 1-36.

Aspect 42: A device for wireless communication, the device comprising a processing system that includes one or more processors and one or more memories coupled with the one or more processors, the processing system configured to cause the device to perform the method of one or more of Aspects 1-36.

Aspect 43: An apparatus for wireless communication at a device, the apparatus comprising one or more memories and one or more processors coupled to the one or more memories, the one or more processors individually or collectively configured to cause the device to perform the method of one or more of Aspects 1-36.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
   a processing system that includes one or more processors and one or more memories coupled with the one or more processors, the processing system configured to cause the UE to:
      receive configuration information for a set of logical channels that indicates a set of synchronization thresholds respectively associated with the set of logical channels; and
      transmit first data via a first logical channel, from the set of logical channels, in association with a delay between the first data and second data of a second logical channel satisfying a synchronization threshold, of the set of synchronization thresholds, that is associated with at least one of the first logical channel or the second logical channel.

2. The UE of claim 1, wherein the set of synchronization thresholds are associated with one or more multi-modal services.

3. The UE of claim 2, wherein the first data is associated with one or more packets that are associated with a reflective quality of service (QoS), a parameter of the reflective QoS indicating an identifier of a multi-modal service of the one or more multi-modal services, the identifier indicating that the first logical channel and the second logical channel are correlated logical channels.

4. The UE of claim 1, wherein the configuration information indicates at least one of:
   respective delay thresholds for the set of logical channels, the delay thresholds being associated with a residual delay budget, or
   respective logical channel priority values for the set of logical channels.

5. The UE of claim 1, wherein:
   the first data is associated with a first one or more packets associated with the first logical channel and the second data is associated with a second one or more packets associated with the second logical channel, the first logical channel being associated with the synchronization threshold, and the first logical channel being associated with the second logical channel in accordance with a multi-modal service; and
   to cause the UE to transmit the first data, the processing system is configured to cause the UE to transmit the first one or more packets in association with prioritizing the first logical channel with respect to one or more higher priority logical channels, included in the set of logical channels, in association with the delay satisfying the synchronization threshold.

6. The UE of claim 5, wherein:
   the delay is between a first time associated with the first one or more packets and a second time associated with the second one or more packets, and
   the first time is associated with the first one or more packets arriving at a packet data convergence protocol (PDCP) component of the UE and the second time is associated with the second one or more packets arriving at the PDCP component.

7. The UE of claim 5, wherein the processing system is further configured to cause the UE to:
   schedule the second one or more packets for transmission in association with a logical channel priority value associated with the second logical channel, the logical channel priority value being indicated by the configuration information.

8. The UE of claim 1, wherein, to cause the UE to transmit the first data, the processing system is configured to cause the UE to:

transmit the first data via one or more uplink resources, the one or more uplink resources being allocated to:
the second data in association with the second data having a residual delay budget that satisfies a delay threshold of the second logical channel, and
the first data in association with the first logical channel being correlated to the second logical channel.

9. The UE of claim 8, wherein the first logical channel is correlated to the second logical channel in association with a multi-modal service.

10. The UE of claim 1, wherein, to cause the UE to transmit the first data, the processing system is configured to cause the UE to:
transmit data, including the first data and the second data, via one or more uplink resources, the one or more uplink resources being allocated:
to a first one or more packets, included in the data, having residual delay budget that satisfy delay thresholds of respective logical channels associated with the first one or more packets, or
to any packets, associated with the first one or more packets in accordance with a multi-modal service, in association with synchronization thresholds associated with the respective logical channels associated with the first one or more packets.

11. The UE of claim 1, wherein the first data and the second data includes one or more protocol data units (PDUs) that include indications, in respective headers of the one or more PDUs, indicating that the one or more PDUs are to be synchronized in accordance with the synchronization threshold, the one or more PDUs being associated with different logical channels.

12. The UE of claim 1, wherein the first logical channel and the second logical channel are correlated in association with an uplink indicator identifying a logical channel correlation associated with the first logical channel and the second logical channel, the logical channel correlation indicating that the first logical channel and the second logical channel are to be synchronized in accordance with the synchronization threshold.

13. A network node for wireless communication, comprising:
a processing system that includes one or more processors and one or more memories coupled with the one or more processors, the processing system configured to cause the network node to:
transmit configuration information for a set of logical channels that indicates a set of synchronization thresholds respectively associated with the set of logical channels; and
receive first data via a first logical channel, from the set of logical channels, in association with a delay between the first data and second data of a second logical channel satisfying a synchronization threshold, of the set of synchronization thresholds, that is associated with at least one of the first logical channel or the second logical channel.

14. The network node of claim 13, wherein the first data is associated with one or more packets that are associated with a reflective quality of service (QoS), a parameter of the reflective QoS indicating an identifier of a multi-modal service of the one or more multi-modal services, the identifier indicating that the first logical channel and the second logical channel are correlated logical channels.

15. The network node of claim 13, wherein the set of synchronization thresholds are associated with one or more multi-modal services.

16. The network node of claim 13, wherein:
the first data is associated with a first one or more packets associated with the first logical channel and the second data is associated with a second one or more packets associated with the second logical channel, the first logical channel being associated with the synchronization threshold, and the first logical channel being associated with the second logical channel in accordance with a multi-modal service; and
to cause the network node to receive the first data, the processing system is configured to cause the network node to receive the first one or more packets in association with prioritizing the first logical channel with respect to one or more higher priority logical channels, included in the set of logical channels, in association with the delay satisfying the synchronization threshold.

17. The network node of claim 13, wherein, to cause the network node to receive the first data, the processing system is configured to cause the network node to:
receive the first data via one or more uplink resources, the one or more uplink resources being allocated to:
the second data in association with the second data having a residual delay budget that satisfies a delay threshold of the second logical channel, and
the first data in association with the first logical channel being correlated to the second logical channel.

18. The network node of claim 13, wherein the configuration information includes an indication of a logical channel correlation between the first logical channel and the second logical channel, the logical channel indicating that the first logical channel and the second logical channel are to be synchronized in accordance with the synchronization threshold.

19. The network node of claim 13, wherein the first data includes two or more protocol data unit (PDU) sets that are to be synchronized in accordance with the synchronization threshold.

20. The network node of claim 13, wherein a packet, associated with the first data, is associated with a packet delay budget, the packet being associated with the first logical channel, and to cause the network node to receive the first data, the processing system is configured to cause the network node to:
receive the packet in accordance with the first logical channel being prioritized using a modified packet delay budget that is modified in association with the packet delay budget and the synchronization threshold.

21. A method for wireless communication by a user equipment (UE), comprising:
receiving configuration information for a set of logical channels that indicates a set of synchronization thresholds respectively associated with the set of logical channels; and
transmitting first data via a first logical channel, from the set of logical channels, in association with a delay between the first data and second data of a second logical channel satisfying a synchronization threshold, of the set of synchronization thresholds, that is associated with at least one of the first logical channel or the second logical channel.

22. The method of claim 21, wherein the first data is associated with one or more packets that are associated with a reflective quality of service (QoS), a parameter of the reflective QoS indicating an identifier of a multi-modal service of the one or more multi-modal services, the identifier indicating that the first logical channel and the second logical channel are correlated logical channels.

23. The method of claim 21, wherein:
- the first data is associated with a first one or more packets associated with the first logical channel and the second data is associated with a second one or more packets associated with the second logical channel, the first logical channel being associated with the synchronization threshold, and the first logical channel being associated with the second logical channel in accordance with a multi-modal service; and
- transmitting the first data comprises transmitting the first one or more packets in association with prioritizing the first logical channel with respect to one or more higher priority logical channels, included in the set of logical channels, in association with the delay satisfying the synchronization threshold.

24. The method of claim 21, wherein transmitting the first data comprises:
- transmitting the first data via one or more uplink resources, the one or more uplink resources being allocated to:
  - the second data in association with the second data having a residual delay budget that satisfies a delay threshold of the second logical channel, and
  - the first data in association with the first logical channel being correlated to the second logical channel.

25. The method of claim 21, wherein transmitting the first data comprises:
- transmitting data, including the first data and the second data, via one or more uplink resources, the one or more uplink resources being allocated to:
  - a first one or more packets, included in the data, having residual delay budget that satisfy delay thresholds of respective logical channels associated with the first one or more packets, or
  - any packets, associated with the first one or more packets in accordance with a multi-modal service, in association with synchronization thresholds associated with the respective logical channels associated with the first one or more packets.

26. A method for wireless communication by a network node, comprising:
- transmitting configuration information for a set of logical channels that indicates a set of synchronization thresholds respectively associated with the set of logical channels; and
- receiving first data via a first logical channel, from the set of logical channels, in association with a delay between the first data and second data of a second logical channel satisfying a synchronization threshold, of the set of synchronization thresholds, that is associated with at least one of the first logical channel or the second logical channel.

27. The method of claim 26, wherein the set of synchronization thresholds are associated with one or more multi-modal services.

28. The method of claim 27, wherein the first data is associated with one or more packets that are associated with a reflective quality of service (QoS), a parameter of the reflective QoS indicating an identifier of a multi-modal service of the one or more multi-modal services, the identifier indicating that the first logical channel and the second logical channel are correlated logical channels.

29. The method of claim 26, wherein:
- the first data is associated with a first one or more packets associated with the first logical channel and the second data is associated with a second one or more packets associated with the second logical channel, the first logical channel being associated with the synchronization threshold, and the first logical channel being associated with the second logical channel in accordance with a multi-modal service; and
- receiving the first one or more packets in association with prioritizing the first logical channel with respect to one or more higher priority logical channels, included in the set of logical channels, in association with the delay satisfying the synchronization threshold.

30. The method of claim 26, wherein receiving the first data comprises:
- receiving the first data via one or more uplink resources, the one or more uplink resources being allocated to:
  - the second data in association with the second data having a residual delay budget that satisfies a delay threshold of the second logical channel, and
  - the first data in association with the first logical channel being correlated to the second logical channel.

* * * * *